(12) United States Patent
Yamanaka

(10) Patent No.: US 8,867,144 B2
(45) Date of Patent: Oct. 21, 2014

(54) INNER FOCUSING TELEPHOTOGRAPHING ZOOM LENS

(71) Applicant: Tamron Co., Ltd., Saitama (JP)

(72) Inventor: Hisayuki Yamanaka, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 13/760,973

(22) Filed: Feb. 6, 2013

(65) Prior Publication Data
US 2013/0201565 A1 Aug. 8, 2013

(30) Foreign Application Priority Data

Feb. 7, 2012 (JP) ................................. 2012-024296

(51) Int. Cl.
*G02B 15/14* (2006.01)
*G02B 15/24* (2006.01)
*G02B 15/17* (2006.01)

(52) U.S. Cl.
CPC ............... *G02B 15/24* (2013.01); *G02B 15/17* (2013.01)
USPC .......................................... 359/684; 359/683

(58) Field of Classification Search
CPC ................................ G02B 15/24; G02B 15/17
USPC ........................... 359/676, 683, 684, 554, 557
See application file for complete search history.

(56) References Cited

U.S. PATENT DOCUMENTS

| 4,874,231 | A  | * | 10/1989 | Aono ........................... 359/684 |
| 6,646,804 | B2 |   | 11/2003 | Harada |
| 7,289,274 | B1 |   | 10/2007 | Saori |
| 2005/0099699 | A1 | * | 5/2005 | Nurishi ........................ 359/676 |
| 2009/0086321 | A1 |   | 4/2009 | Mizuguchi et al. |

FOREIGN PATENT DOCUMENTS

| JP | 07-013079 | A | 1/1995 |
| JP | 3564061 | B2 | 9/2004 |
| JP | 2007-212830 | A | 8/2007 |
| JP | 2009-086535 | A | 4/2009 |
| JP | 2009-156893 | A | 7/2009 |
| JP | 4401469 | B2 | 11/2009 |

* cited by examiner

*Primary Examiner* — Scott J Sugarman
(74) *Attorney, Agent, or Firm* — Westerman, Hattori, Daniels & Adrian, LLP

(57) ABSTRACT

The present invention is directed to providing a large aperture telephotographing zoom lens that employs an inner-focusing system to enable quick focusing and avoid a great aberration when the zoom lens renders the close object in focus. The zoom lens comprises at least five groups of lens pieces arranged in series, namely, the foremost or first lens group of positive refractivity positioned the closest to the object, the succeeding second lens group of negative refractivity, the third lens group of negative refractivity, the fourth lens group of positive refractivity, and the rearmost or fifth lens group of positive refractivity. During varying the magnification for zooming in a transition from the wide-angle end to the telephoto end, all the lens pieces of the second, third, and fourth lens groups are moved toward the image plane, and the third lens group alone is displaced for focusing.

9 Claims, 28 Drawing Sheets

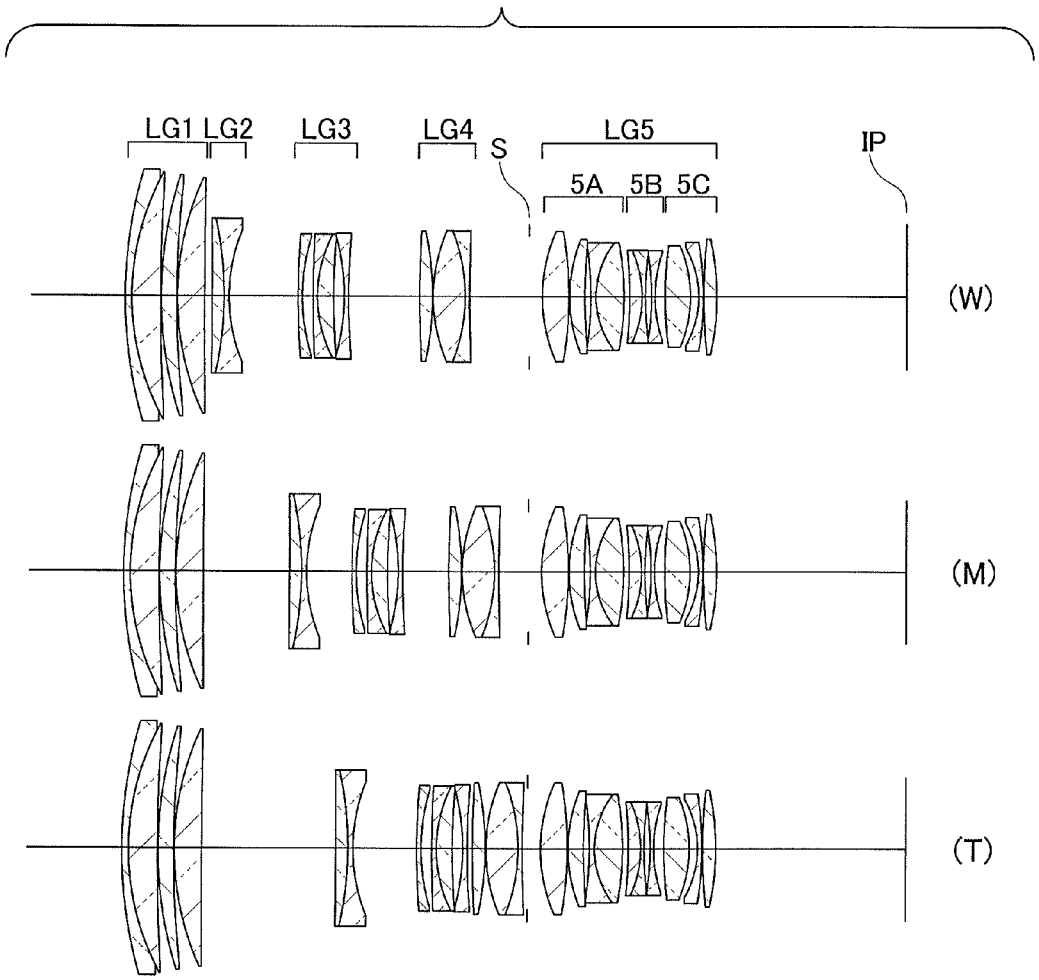

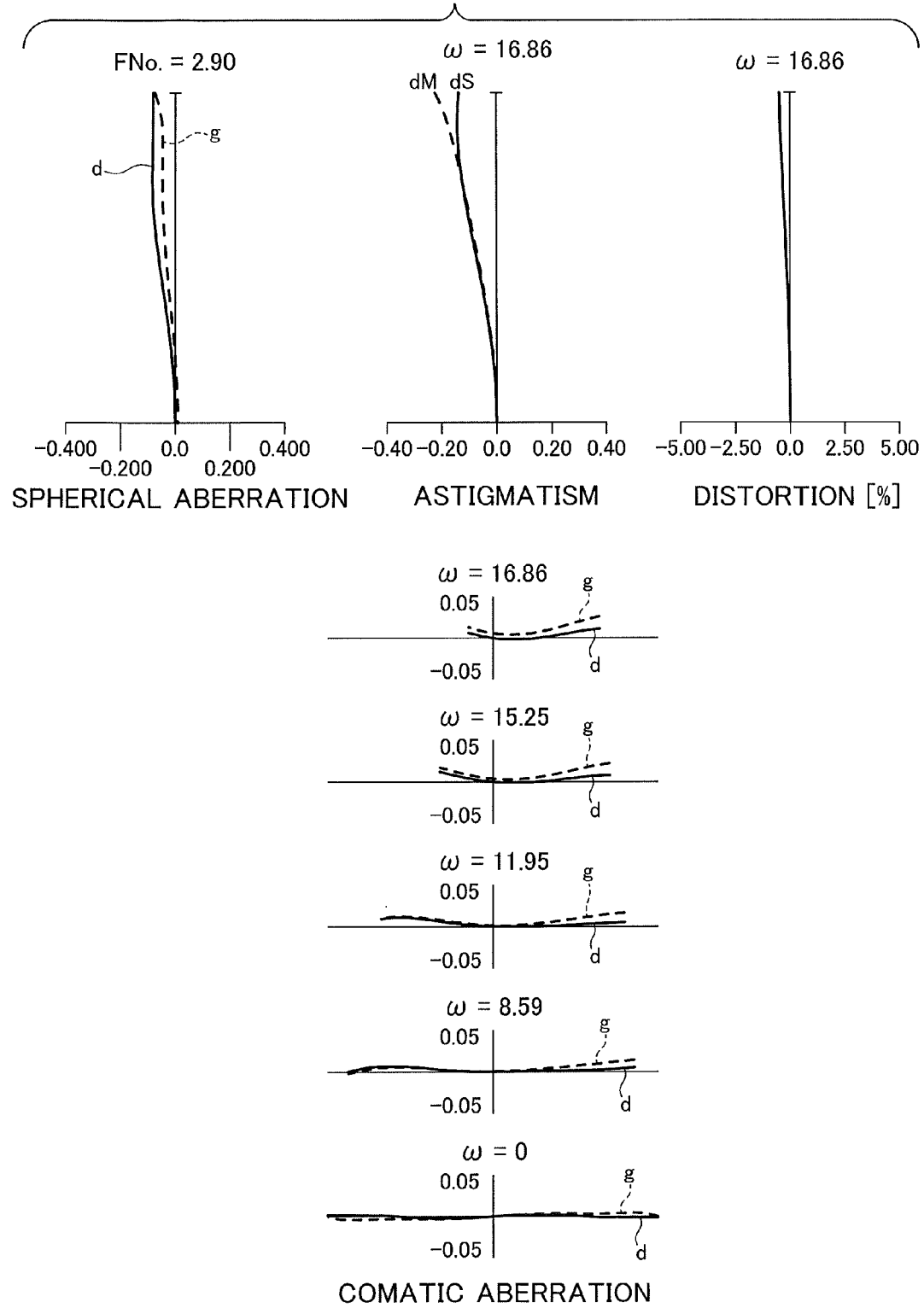

Figure 9:
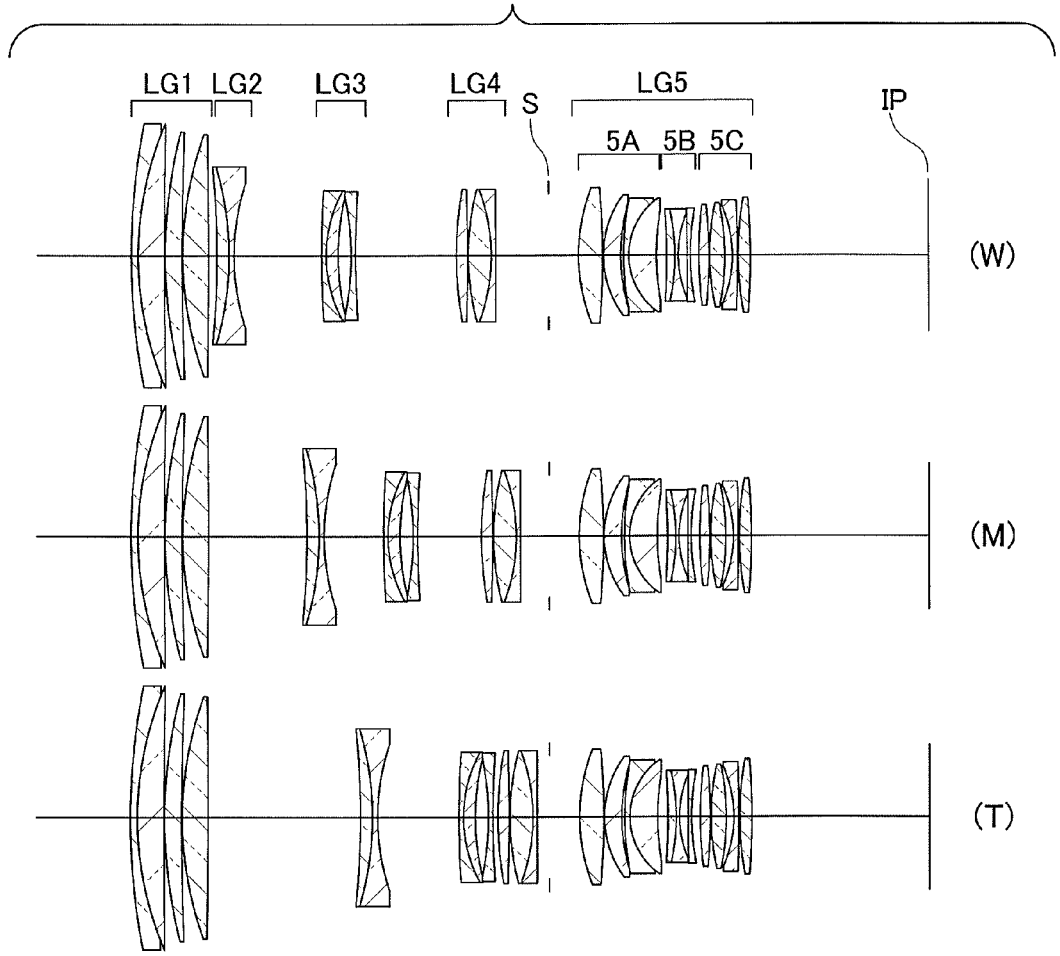

FIG. 2b
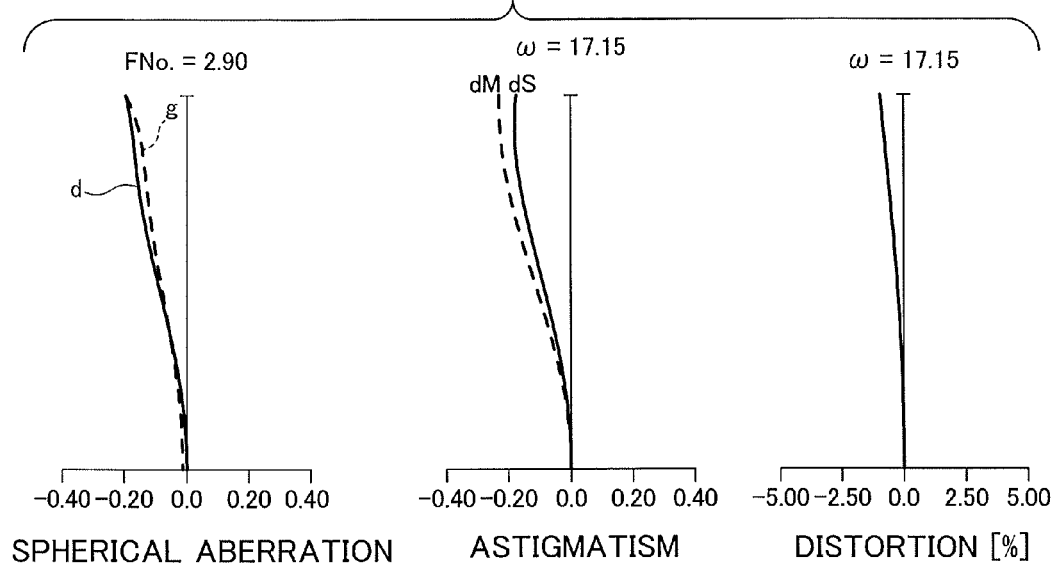
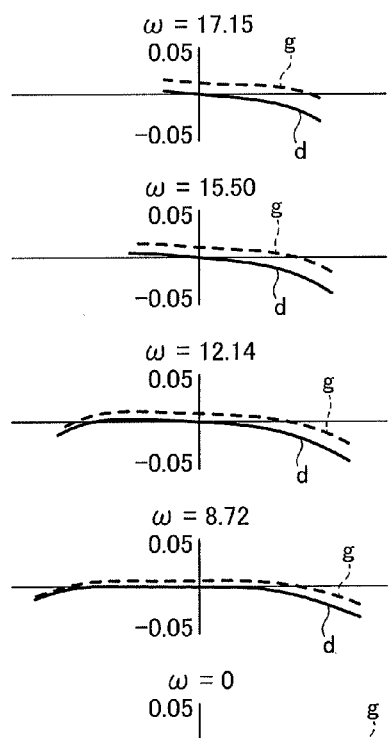

FIG. 3a
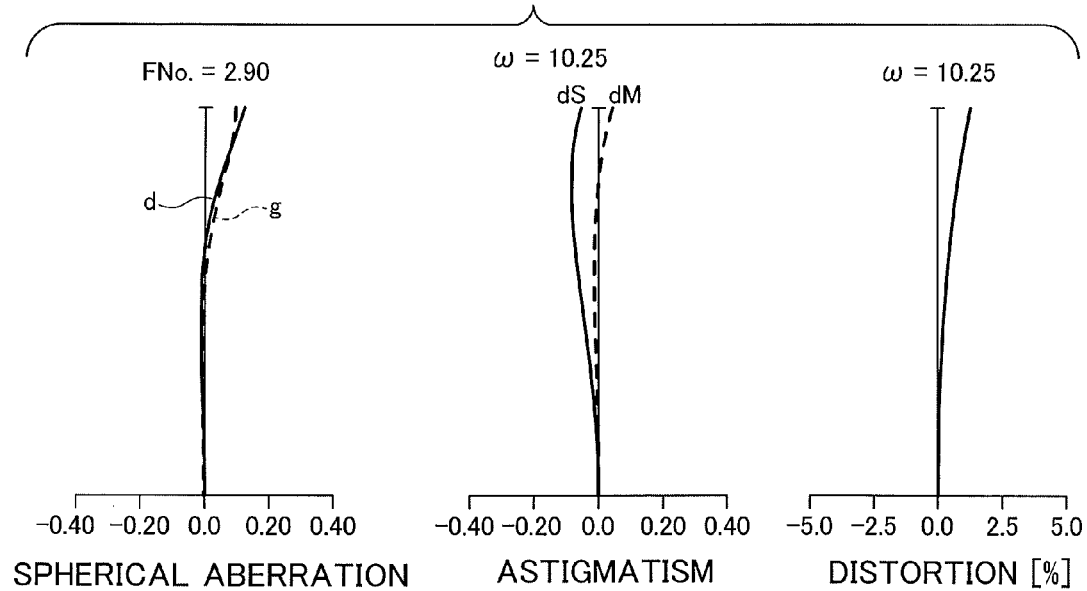
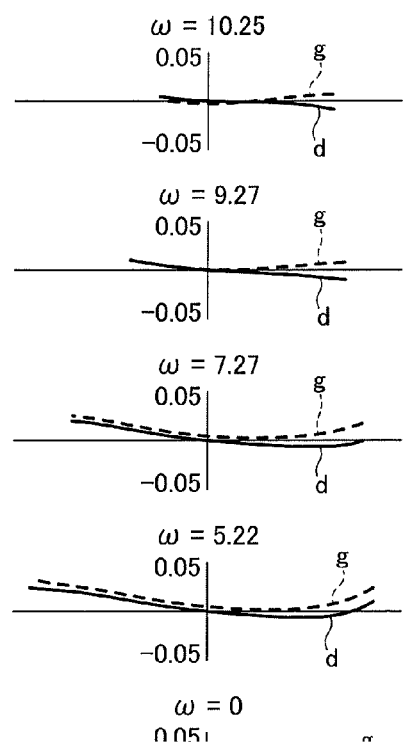

FIG. 3b
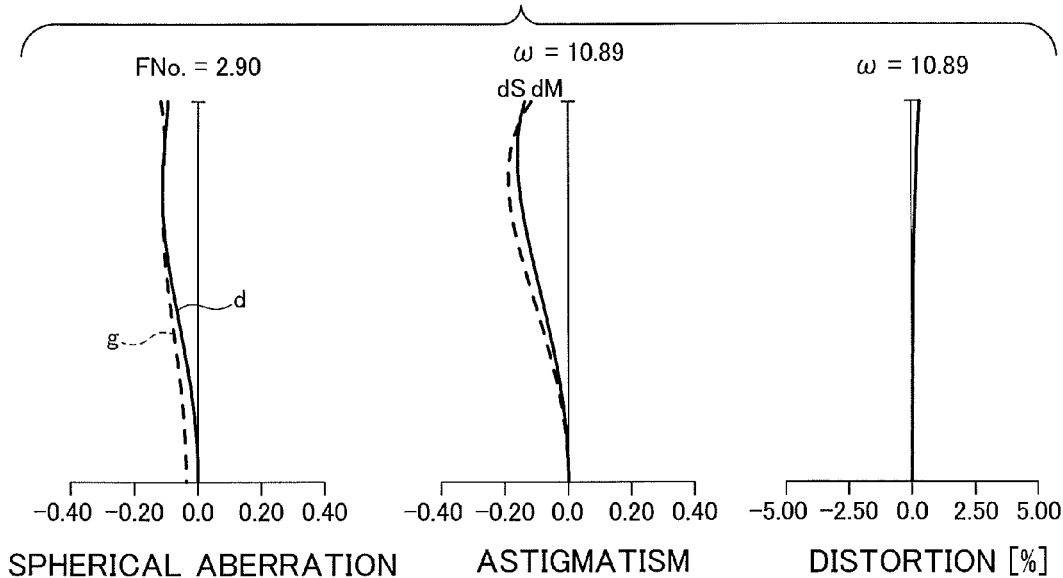
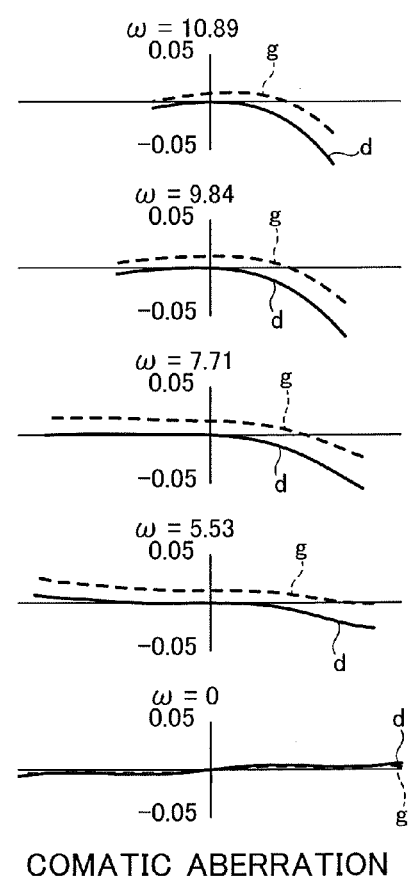
COMATIC ABERRATION

FIG. 4a
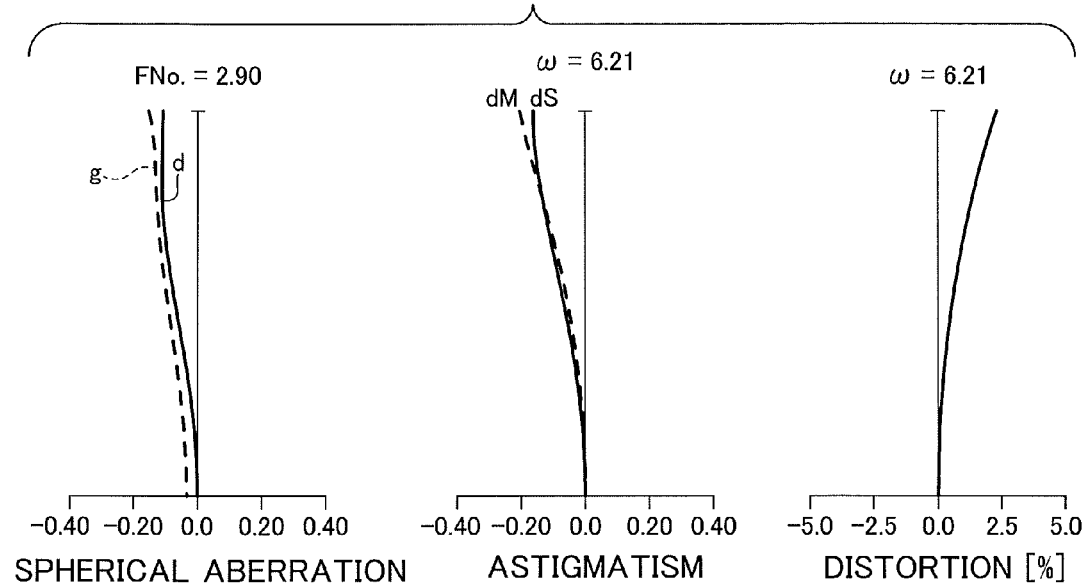
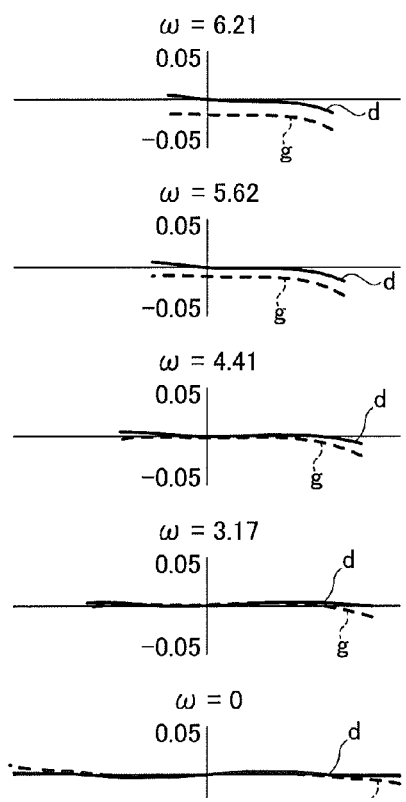

FIG. 4b
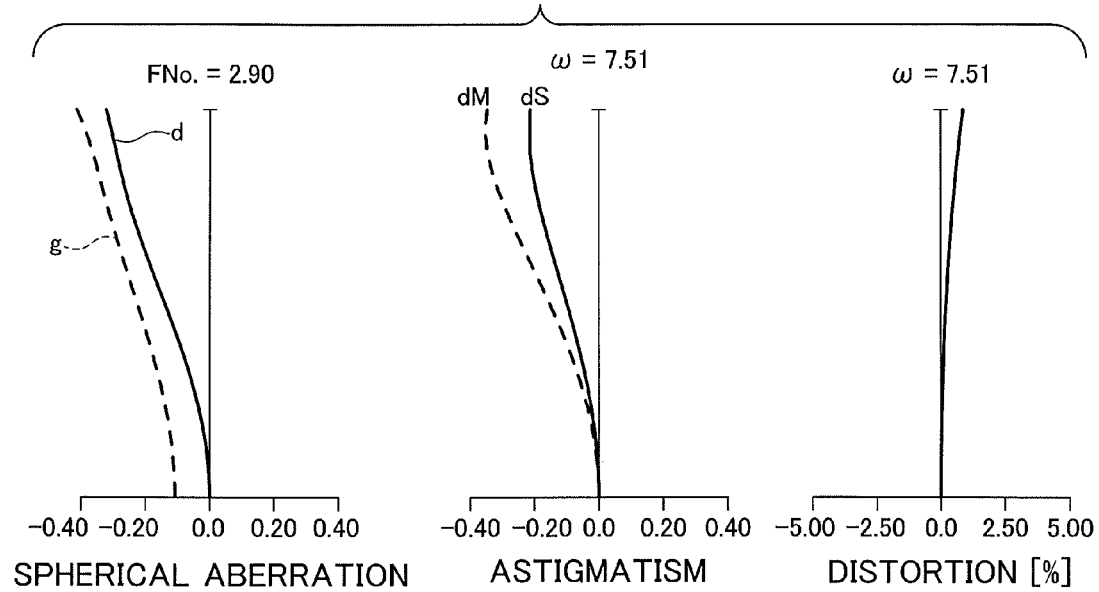
SPHERICAL ABERRATION   ASTIGMATISM   DISTORTION [%]
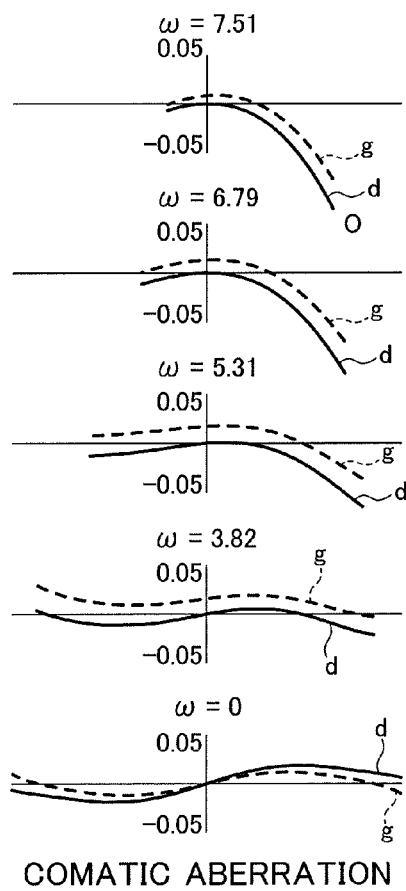
COMATIC ABERRATION

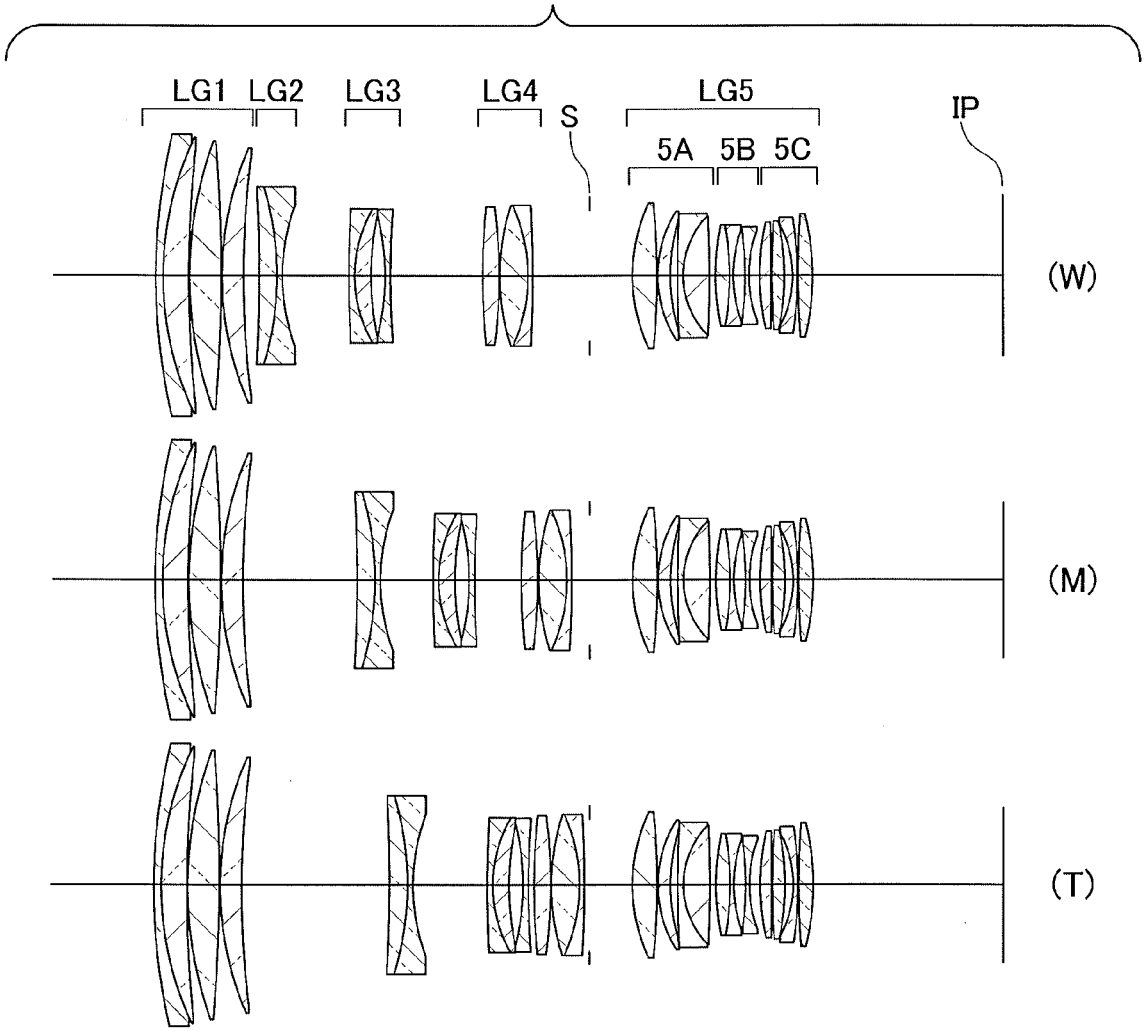

FIG. 6a
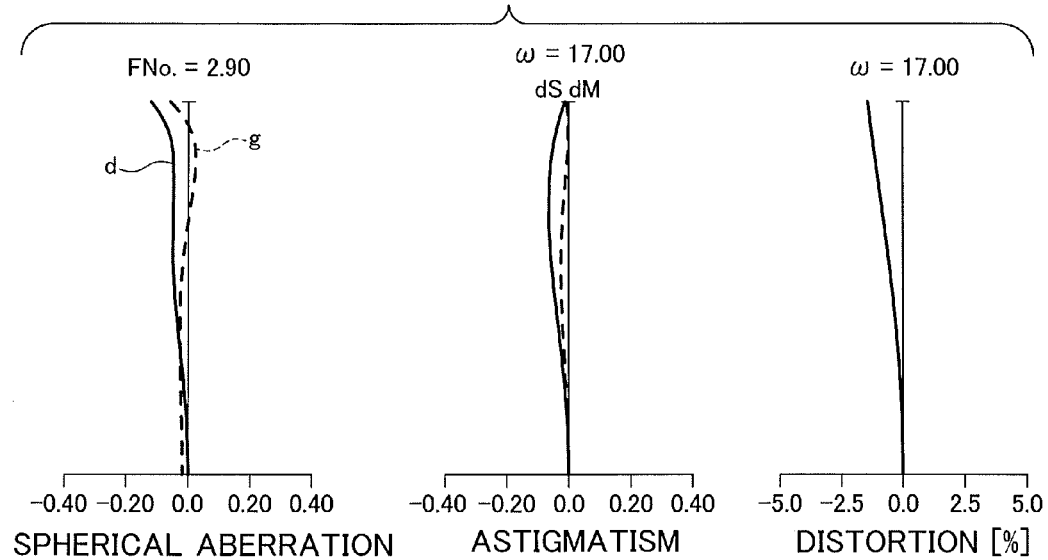
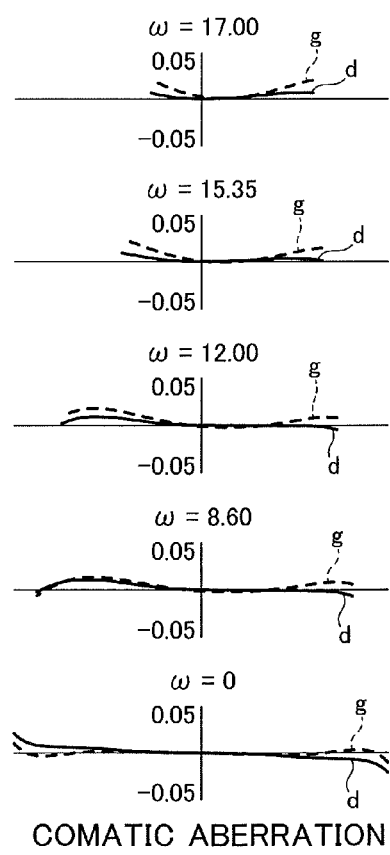
COMATIC ABERRATION

FIG. 6b
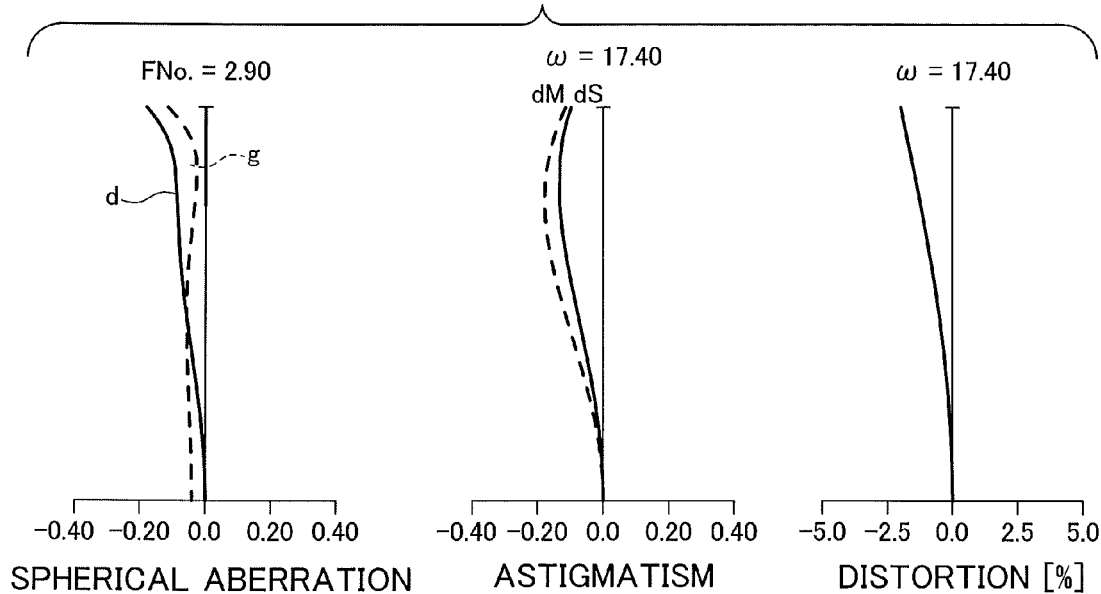
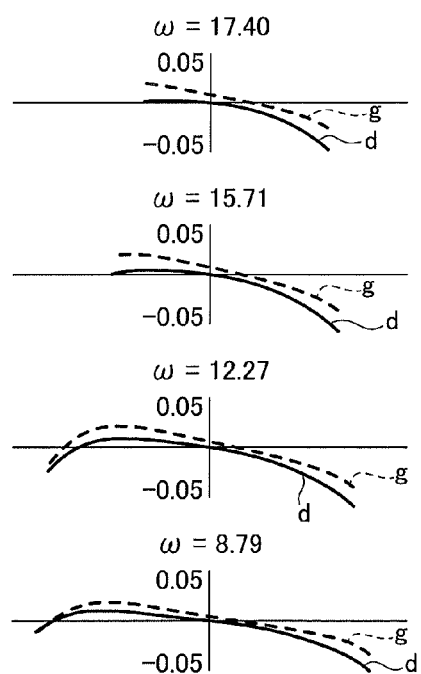

FIG. 7a
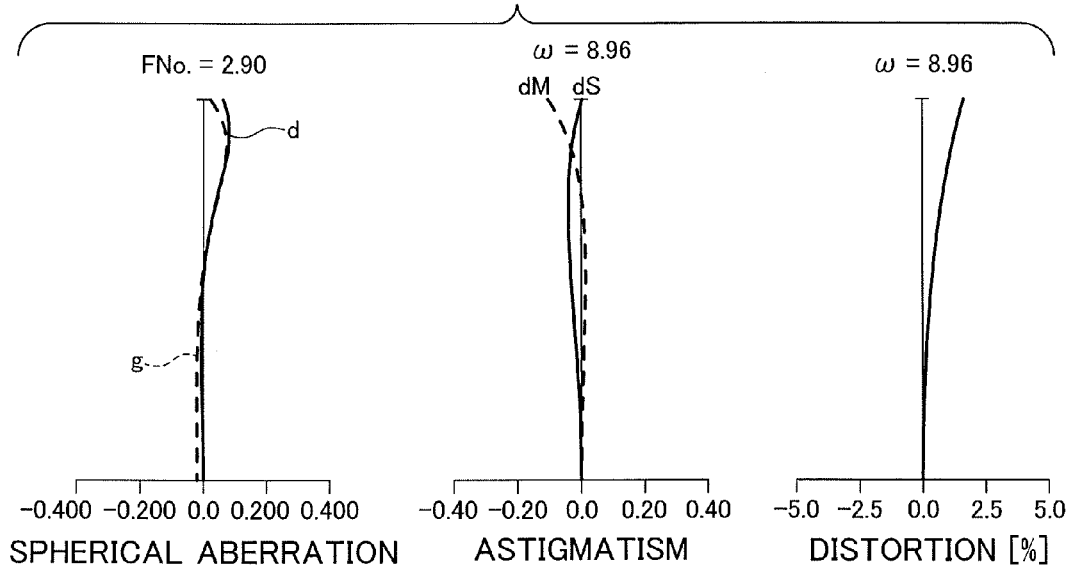
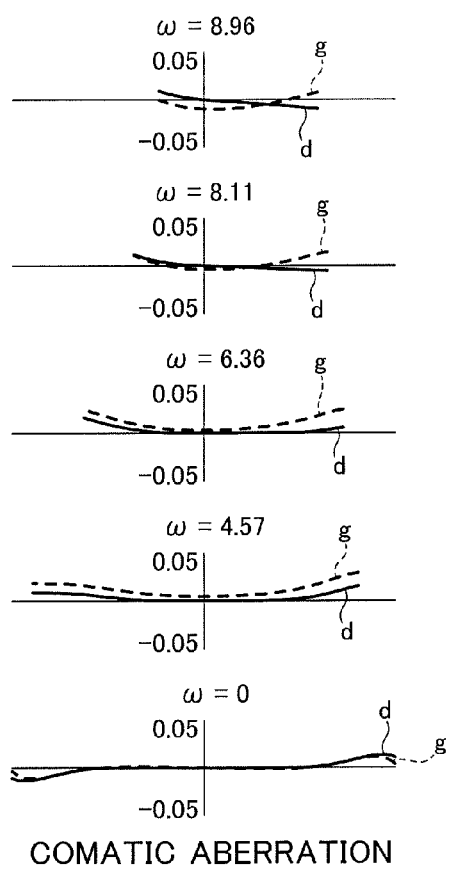
COMATIC ABERRATION

FIG. 7b
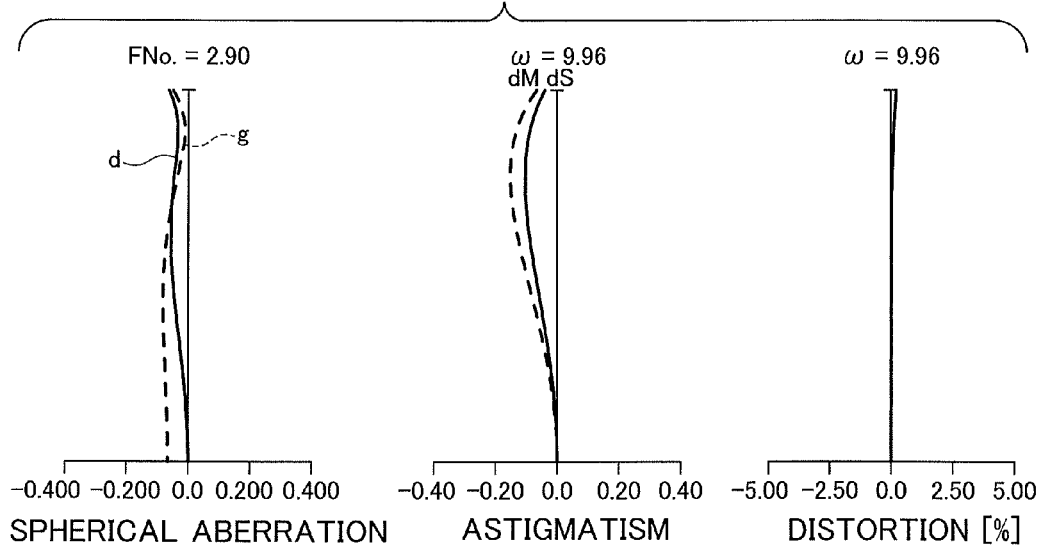
SPHERICAL ABERRATION   ASTIGMATISM   DISTORTION [%]
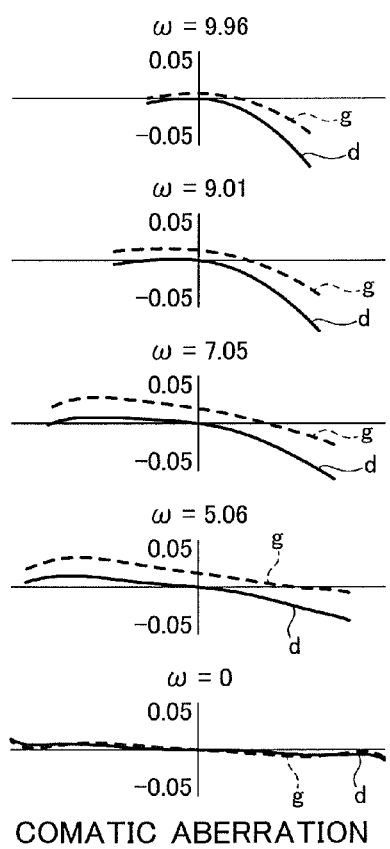
COMATIC ABERRATION

FIG. 8a
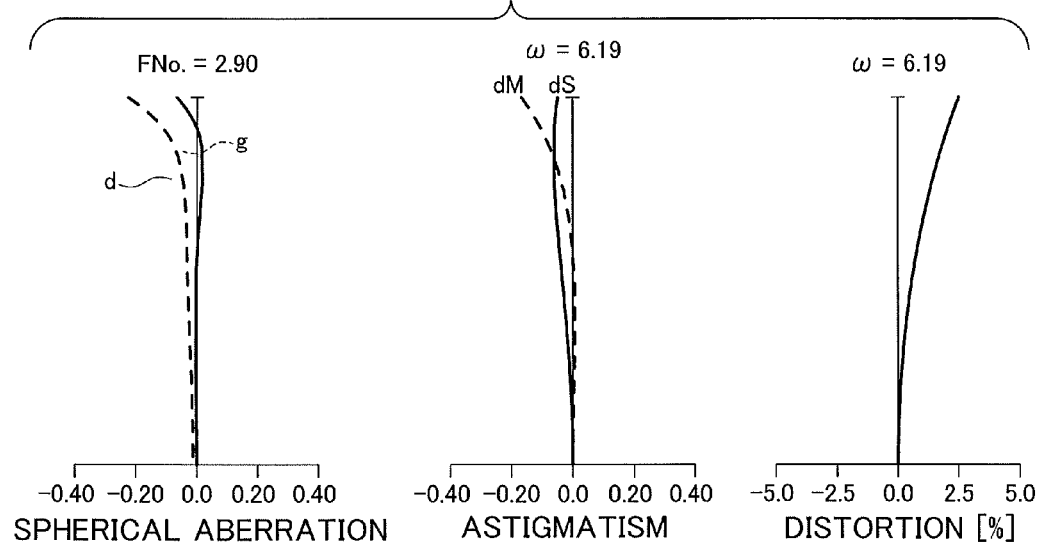
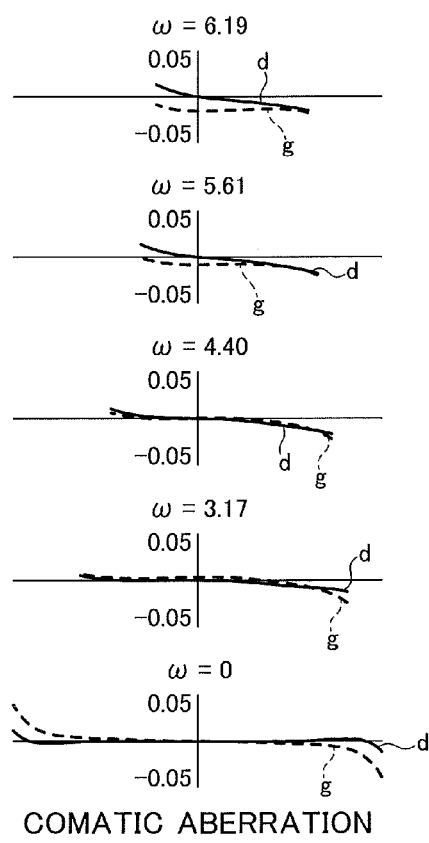
COMATIC ABERRATION

FIG. 8b
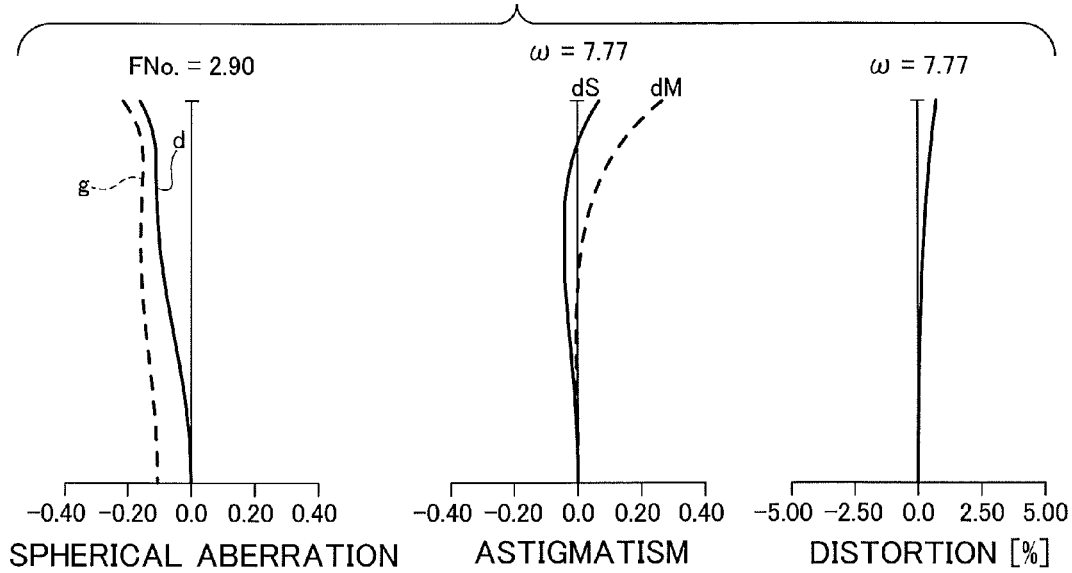
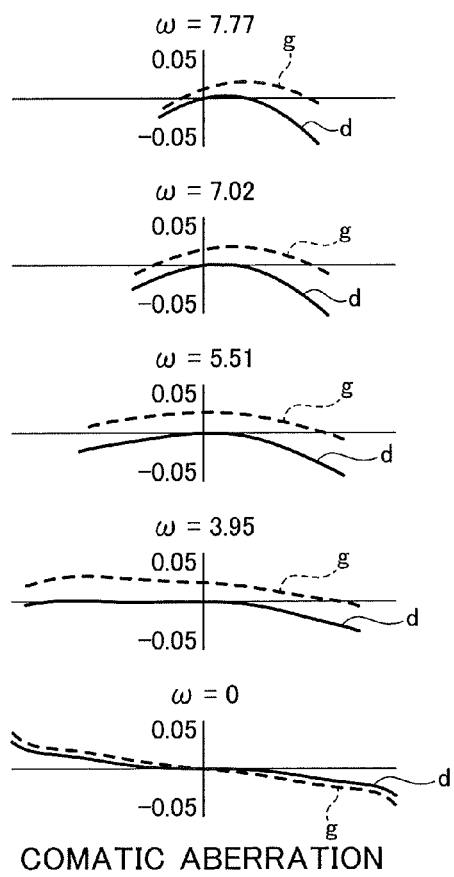
COMATIC ABERRATION

FIG. 10a
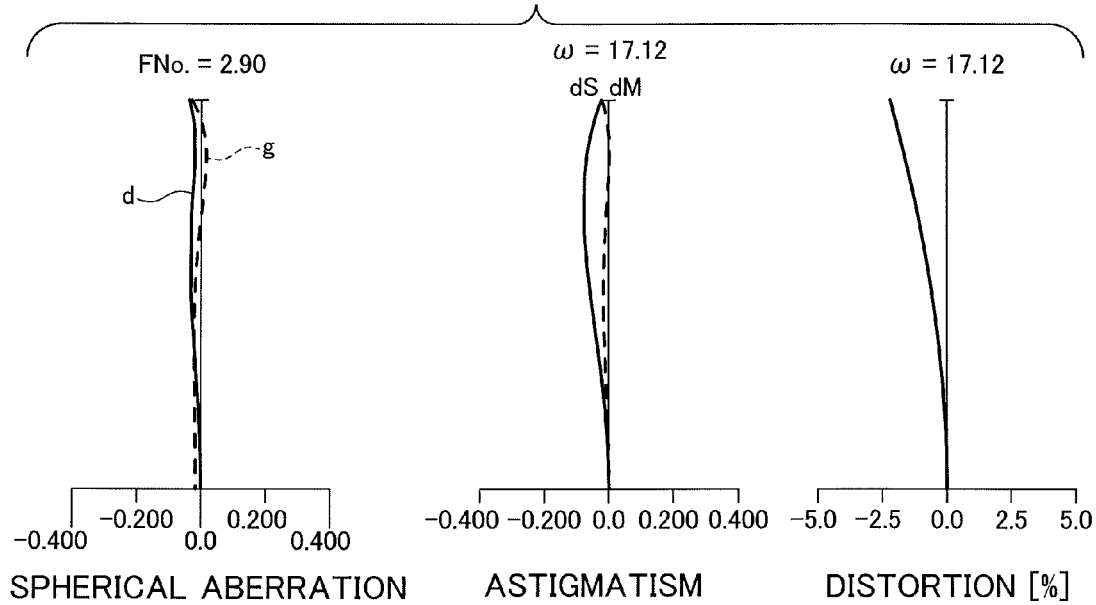
SPHERICAL ABERRATION   ASTIGMATISM   DISTORTION [%]
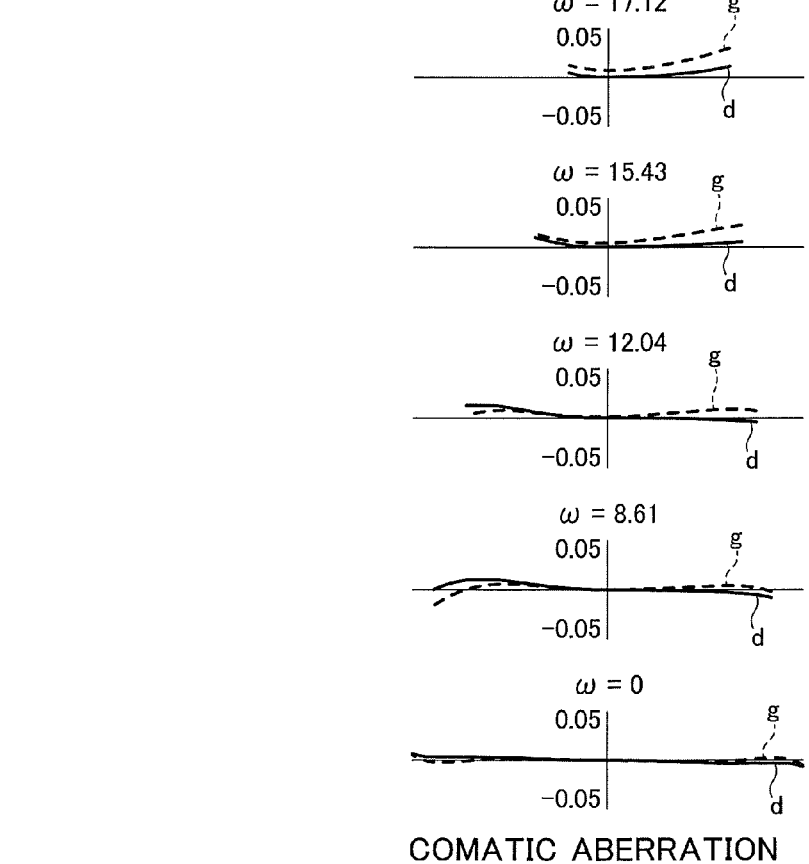
COMATIC ABERRATION

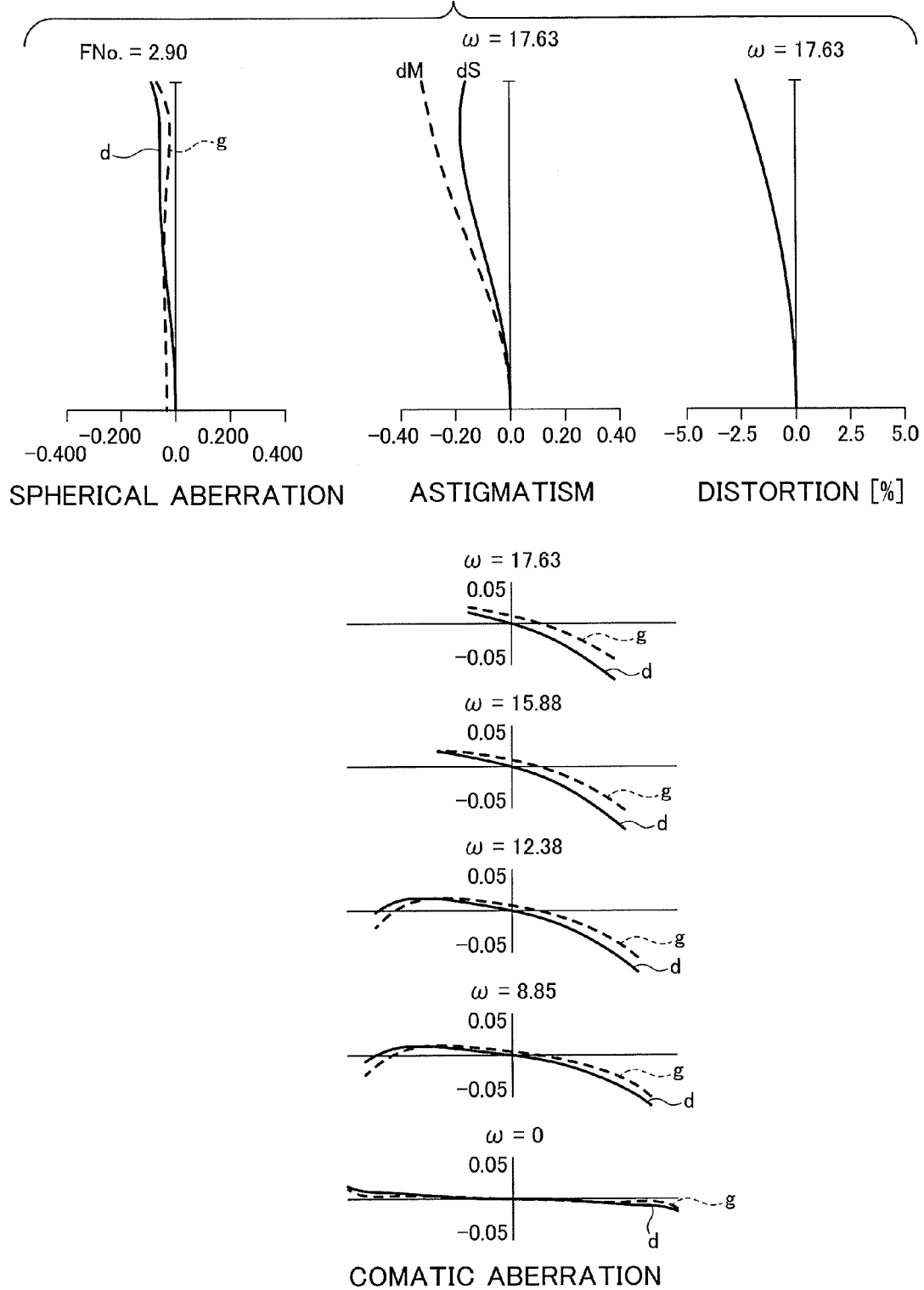

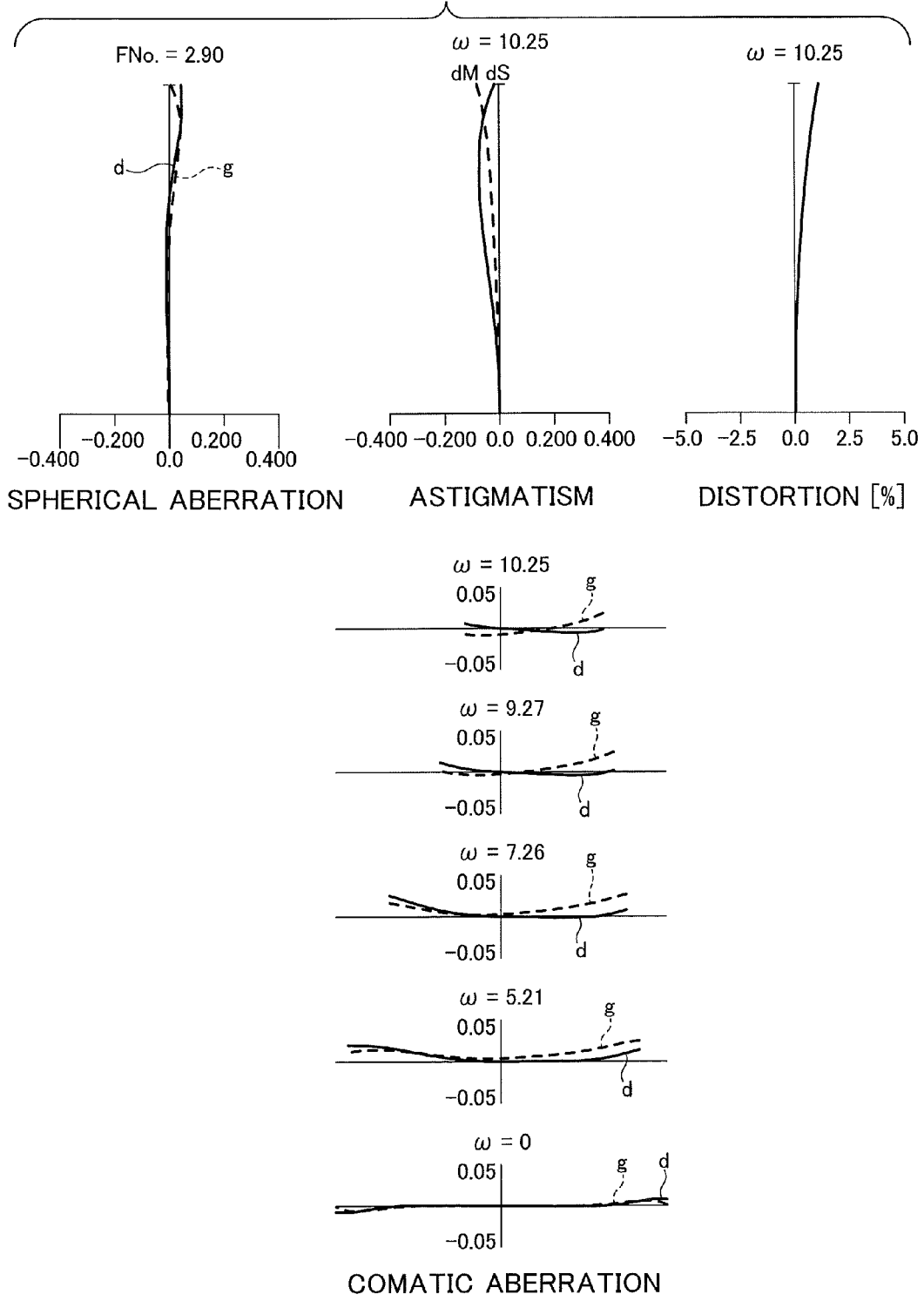

FIG. 11b
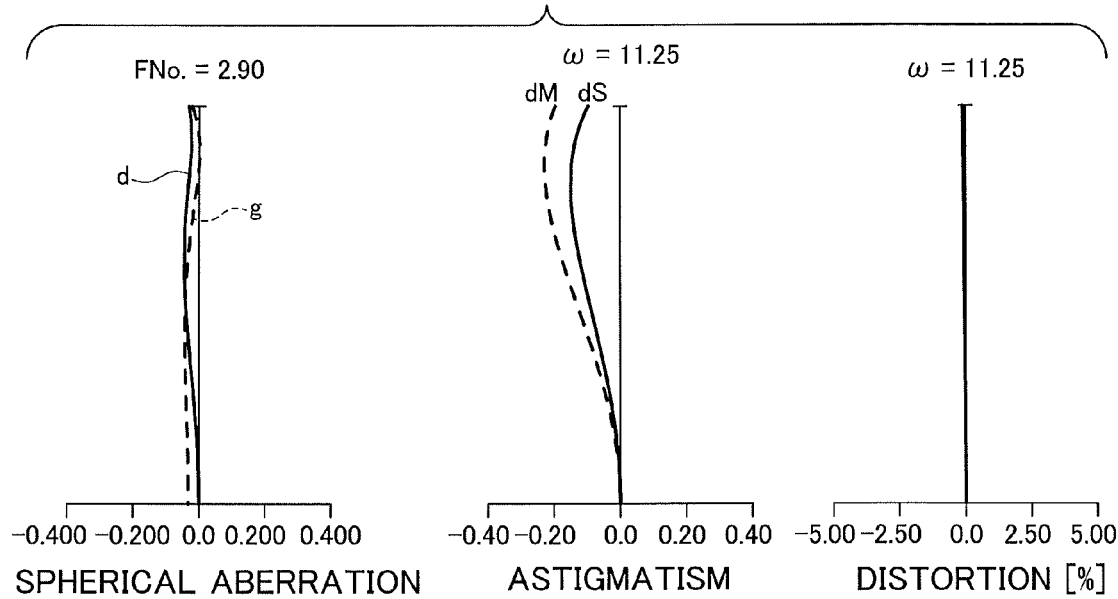
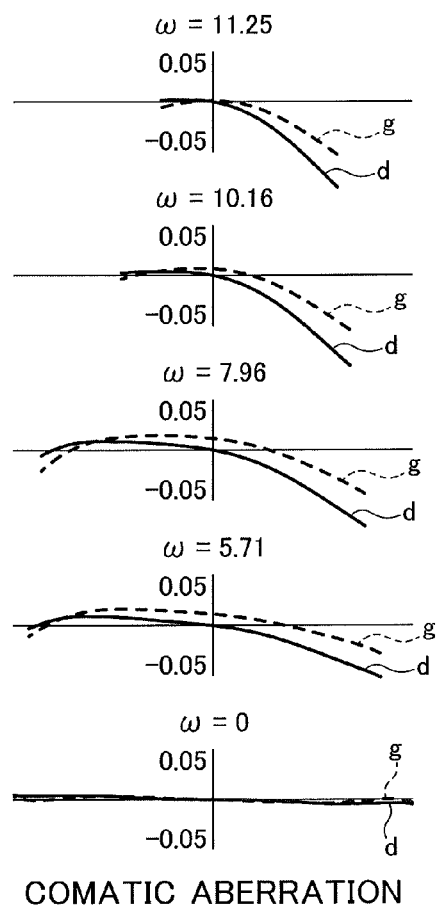
COMATIC ABERRATION

FIG. 12a
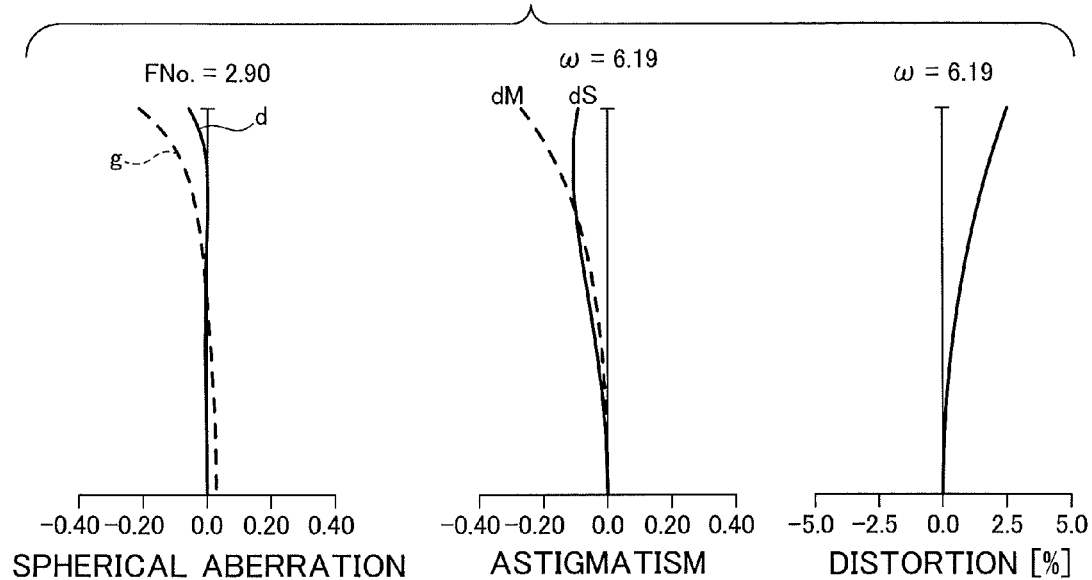
SPHERICAL ABERRATION   ASTIGMATISM   DISTORTION [%]
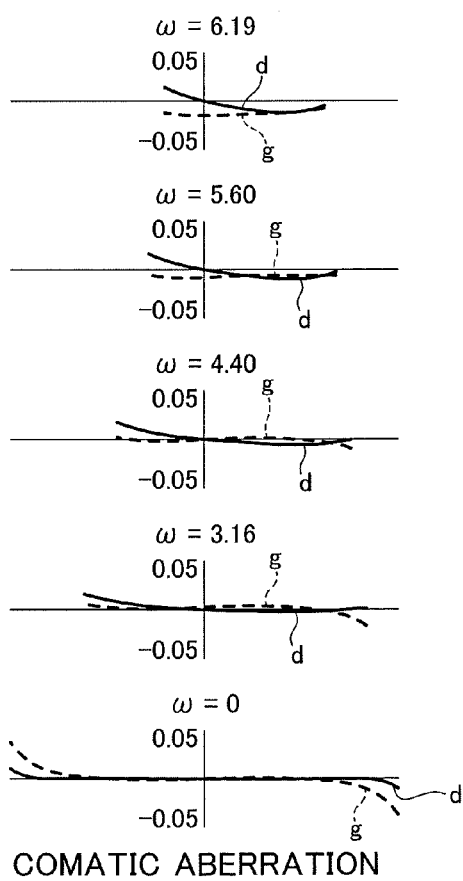
COMATIC ABERRATION FIG. 12b
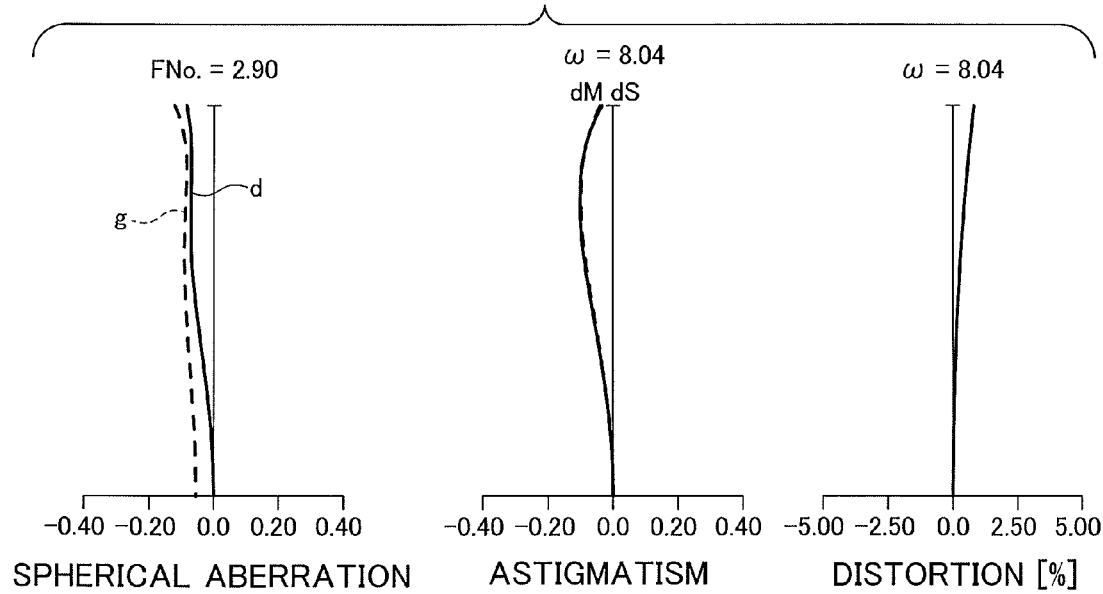
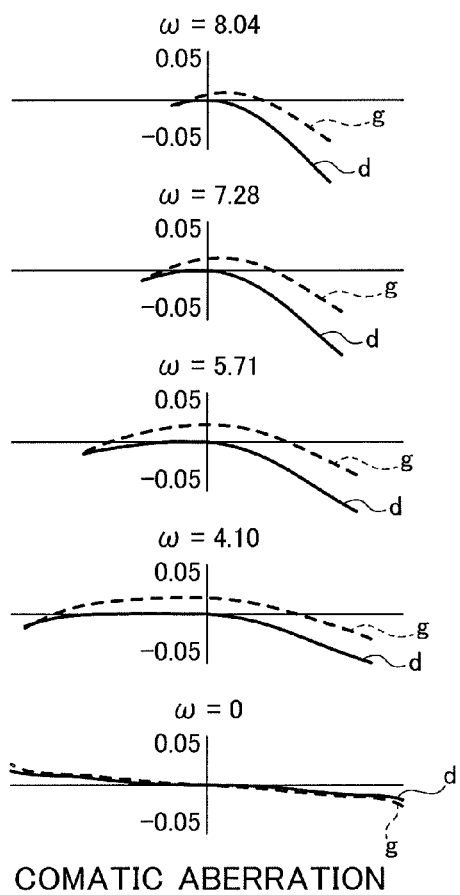
COMATIC ABERRATION

FIG. 14a
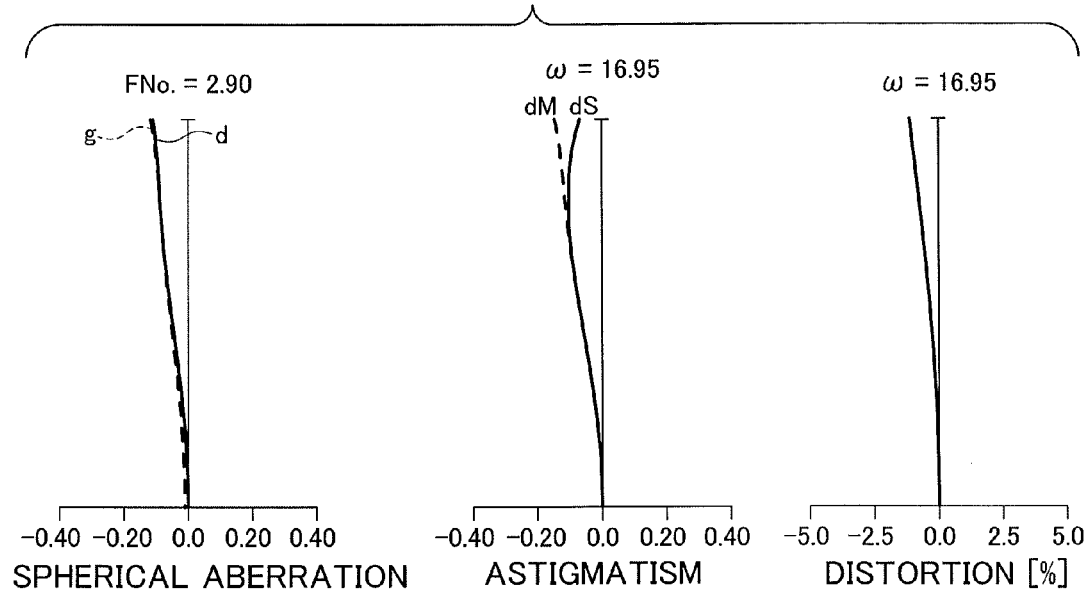
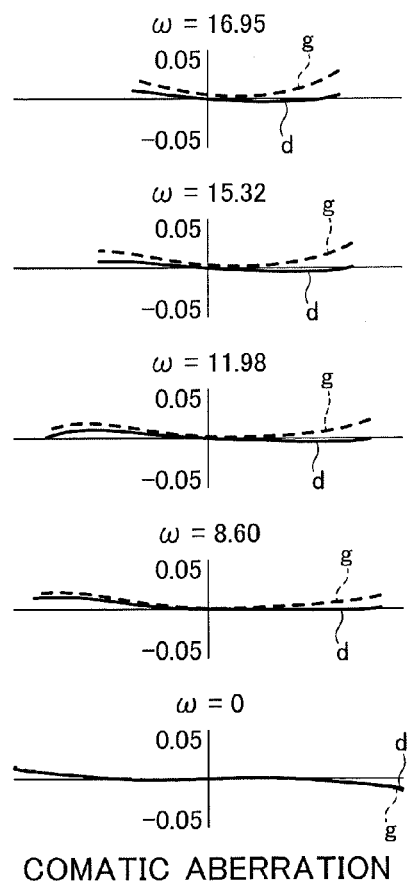

FIG. 14b
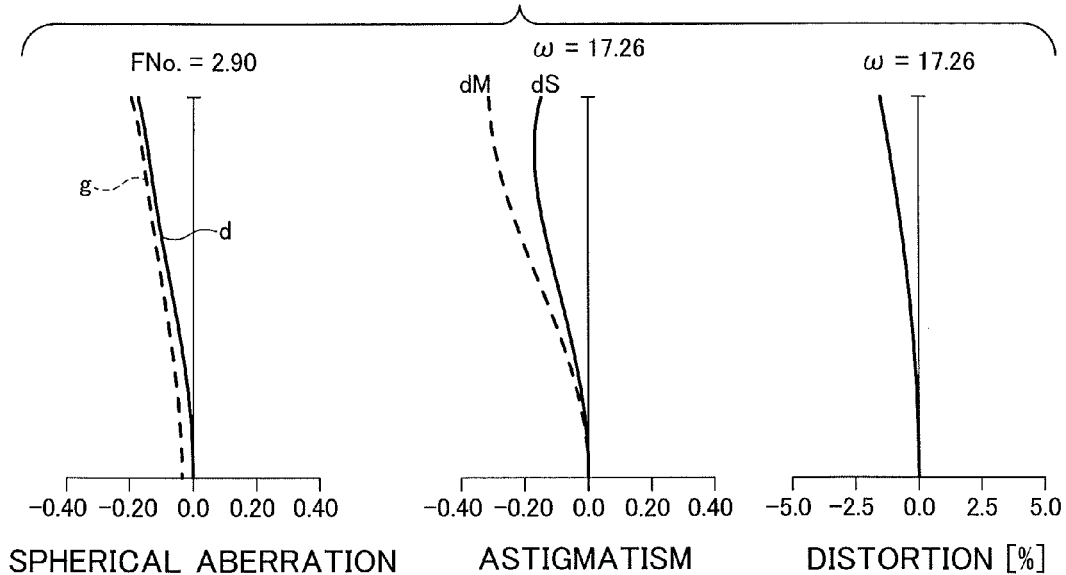
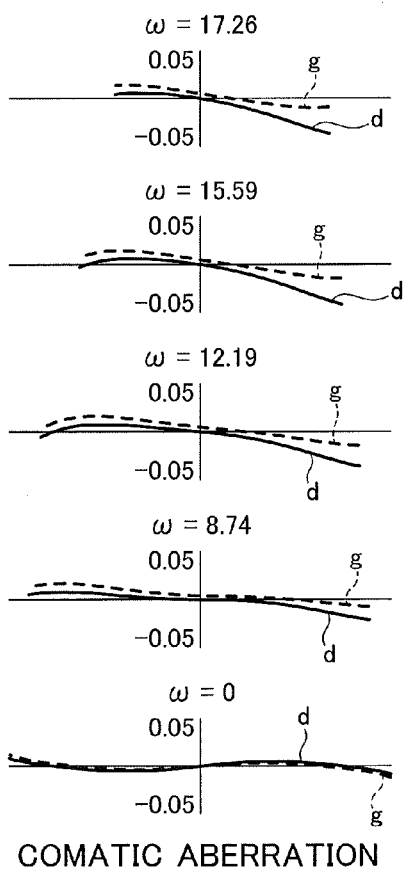

FIG. 15a
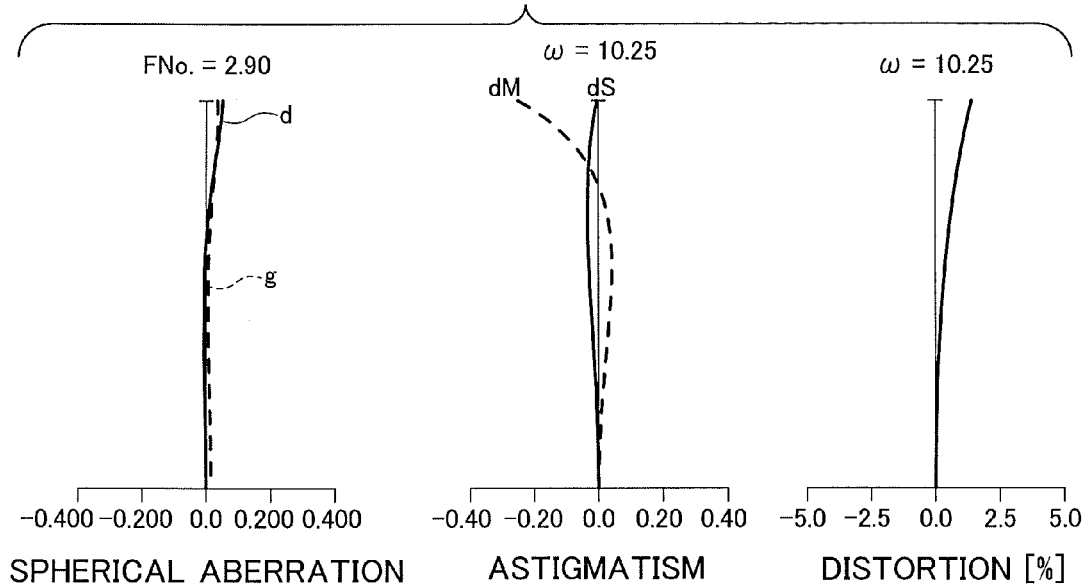
SPHERICAL ABERRATION  ASTIGMATISM  DISTORTION [%]
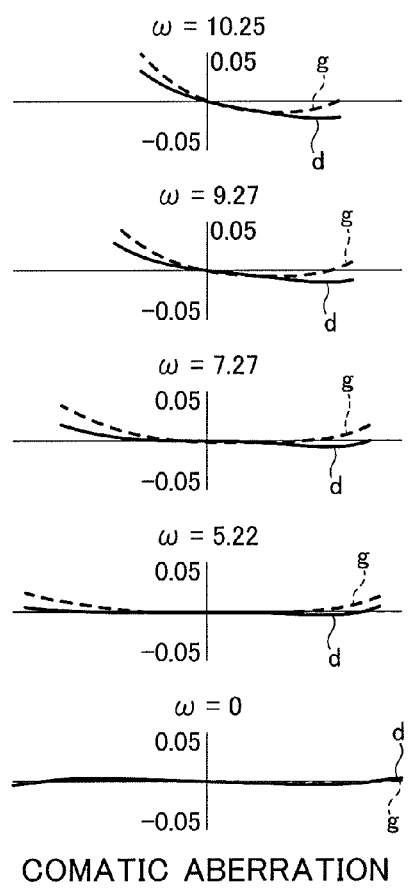
COMATIC ABERRATION FIG. 15b
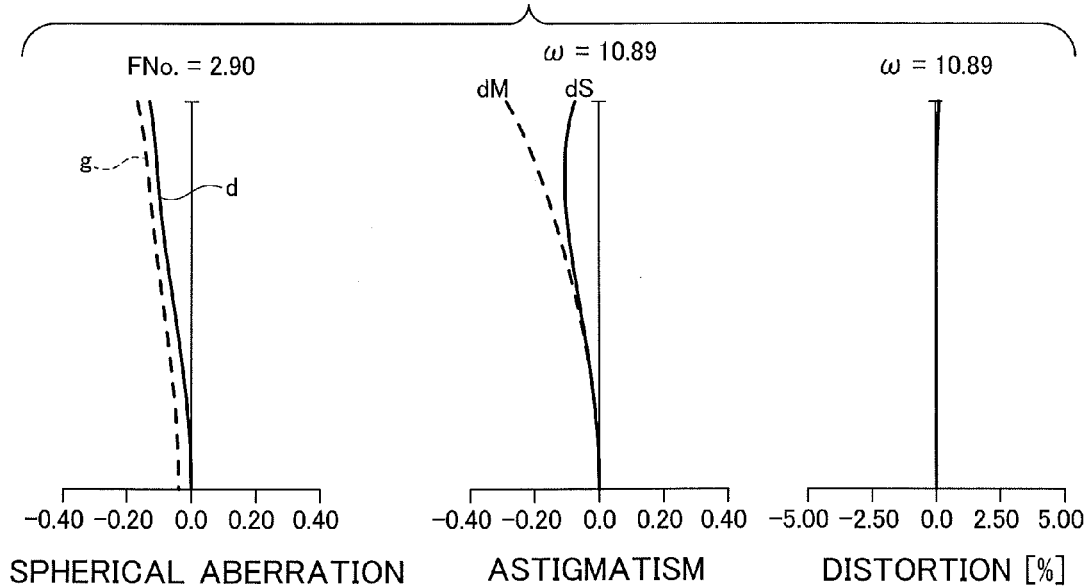
SPHERICAL ABERRATION — ASTIGMATISM — DISTORTION [%]
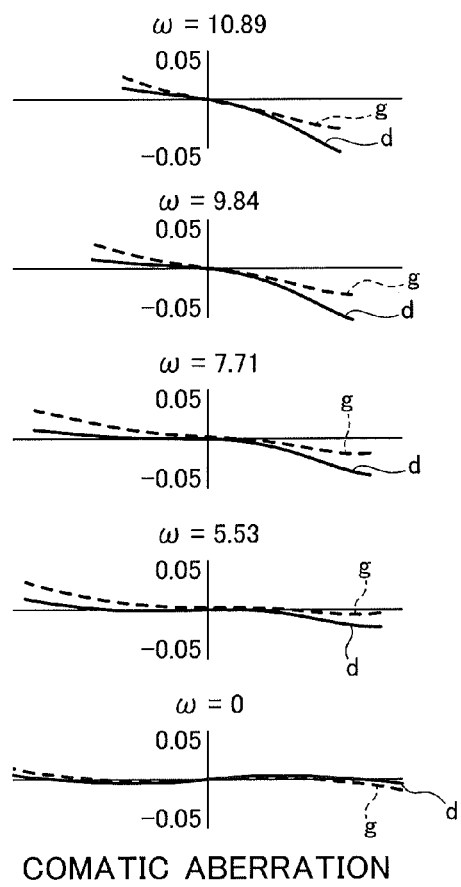
COMATIC ABERRATION

FIG. 16a
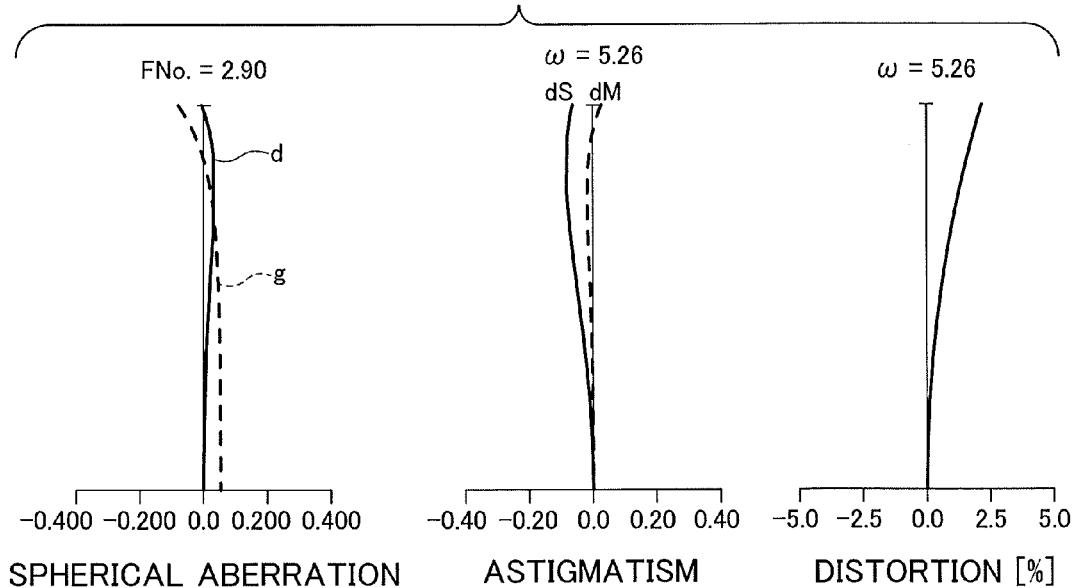
SPHERICAL ABERRATION    ASTIGMATISM    DISTORTION [%]
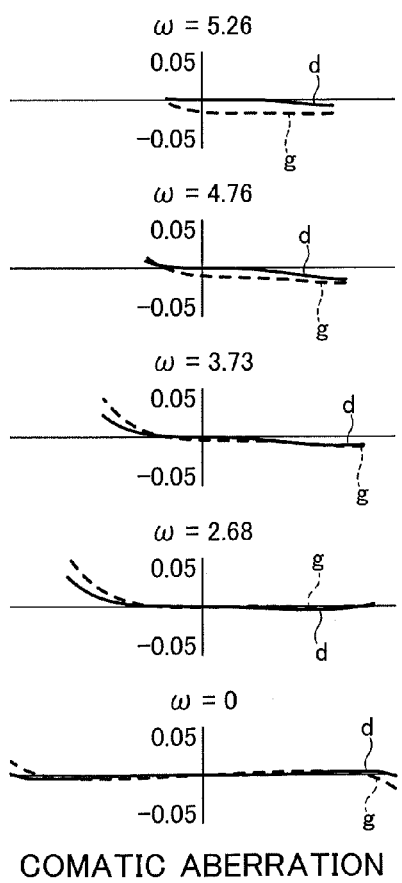
COMATIC ABERRATION FIG. 16b
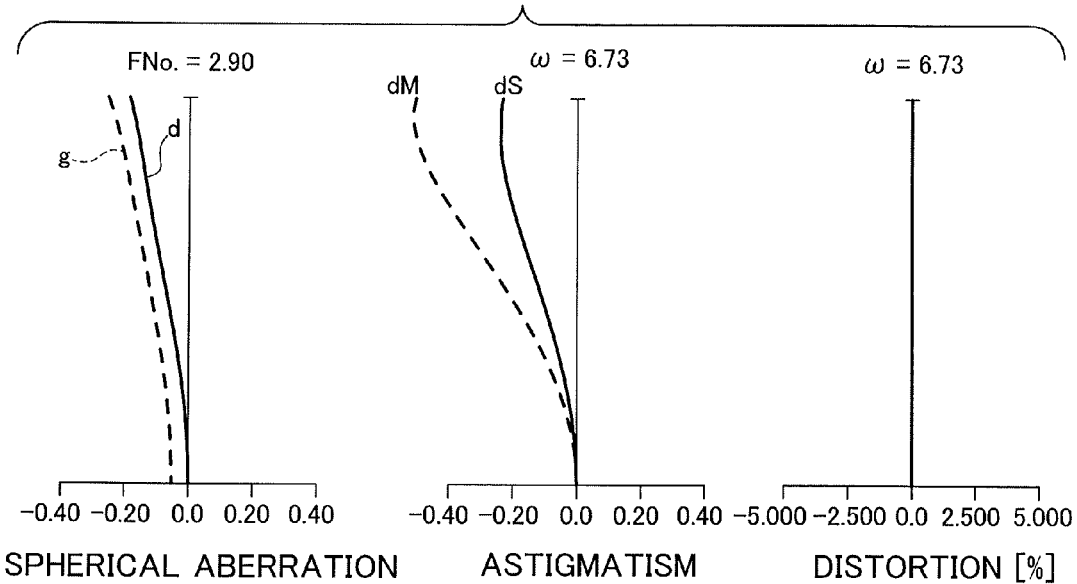
SPHERICAL ABERRATION   ASTIGMATISM   DISTORTION [%]
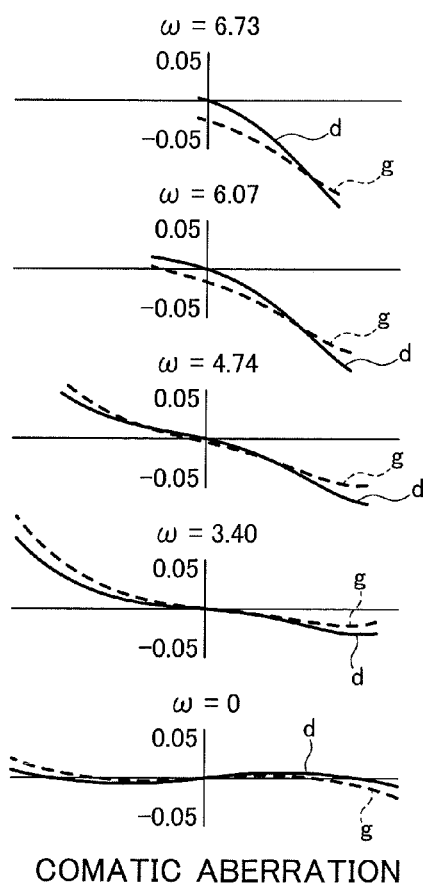
COMATIC ABERRATION

INNER FOCUSING TELEPHOTOGRAPHING ZOOM LENS

FIELD OF THE INVENTION

The present invention relates to a large aperture inner focusing telephotographing zoom lens suitable for 35-mm single lens reflex cameras, video cameras, digital cameras, and the like, and more particularly, to a large aperture inner focusing telephotographing zoom lens that is as much as 2.8 to 3.3 in zoom ratio and as small as 2.8 in F-number.

BACKGROUND ART

Some of the prior art focusing methods of a large aperture zoom lens include a foremost lens focusing system in which the first one of groups of lens pieces in series is displaced for focusing. The foremost lens focusing system has a considerable diameter of the lens group that is to be displaced for focusing and accordingly has an increased weight, and such a system is inappropriate for quick focusing. This focusing method is disadvantageous in its poor operability because displacement of the lens pieces during focusing greatly varies a weight balance of the zoom lens. In addition, when the zoom lens at the telephoto end renders the close object in focus, spherical aberration tends to be under-corrected, which is hard to compensate for.

Some other prior art focusing methods of the large aperture zoom lens include a foremost lens inner-focusing system in which the zoom lens has its first one of groups of lens pieces in series functionally divided into two, namely, front and rear subsets of lens pieces, and the rear subset is displaced for focusing. In contrast with the aforementioned foremost lens focusing system, the foremost lens inner-focusing system is more advantageous in that it can relatively easily suppress the variation in spherical aberration when the zoom lens at the telephoto end renders the close object in focus although it still has difficulty in fully compensating for the aberration. Regretfully, a drastic reduction in weight of the lens subset that is to be displaced for focusing is unattainable, and hence, such a focusing system is not suitable for quick focusing.

Further some other prior art focusing methods of the larger aperture zoom lens include an inner-focusing system in which the second one and/or the further succeeding one(s) of groups of lens pieces is displaced for focusing. Such a focusing system generally enables the zoom lens to reduce its diameter, which makes the zoom lens suitable for quick focusing and well-balanced in weight during the focusing operation. However, the inner-focusing system is disadvantageous in that the greater a diameter of the first group of lens pieces is, the more it has difficulty in suppressing the variation in the aberration when the zoom lens renders the close object in focus.

The list of the prior art documents cited hereinafter is provided below:
Patent Document 1
Japanese Patent No. 4401469
Patent Document 2
Preliminary Publication of Unexamined Japanese Patent Application No. 2007-212830
Patent Document 3
Preliminary Publication of Unexamined Japanese Patent Application No. 2009-086535
Patent Document 4
Preliminary Publication of Unexamined Japanese Patent Application No. 2009-156893
Patent Document 5
Preliminary Publication of Unexamined Japanese Patent Application No. H07-013079
Patent Document 6
Japanese Patent No. 3564061

Some exemplary prior art large aperture telephotographing zoom lenses already disclosed include that which comprises the foremost or first lens group of positive refractivity positioned the closest to the imaging plane, the succeeding second lens group of negative refractivity, the third lens group of positive refractivity, and the rearmost or fourth lens group of positive refractivity arranged in series, and employs the front lens inner-focusing system in which the first lens group is divided into two, namely, front and rear subsets of lens pieces, and the rear subset are displaced for focusing (e.g., see Patent Documents 1 and 2).

Such a prior art large aperture telephotographing zoom lens has the lens subset that is to be displaced for focusing is heavy as already mentioned and hence is not suitable for quick focusing. Also, the zoom lens is not a solution to the problem that spherical aberration tends to be under-corrected especially when the zoom lens at the telephoto end renders the close object in focus.

Some other prior art large aperture zoom lenses already disclosed include that which comprises the foremost or first lens group of positive refractivity positioned the closest to the object, the succeeding second lens group of negative refractivity, the third lens group of positive refractivity, and the rearmost or fourth lens group of positive refractivity arranged in series, and employs the inner-focusing system in which the third lens group is displaced for focusing (e.g., see Patent Documents 3 and 4).

Such a prior art large aperture telephotographing zoom lens is capable of quick focusing. However, the focusing operation by the third lens group of positive refractivity permits astigmatism to vary to be more under-corrected during a transition from a state of the infinity point in focus to another state of the close object in focus, especially, when the zoom lens takes a posture at the wide-angle end, and thus, such a system is disadvantageous in that the astigmatism cannot be fully compensated for when the zoom lens renders the close object in focus.

Still some other prior art large aperture telephotographing zoom lenses already disclosed include that which comprises the foremost or first lens group of positive refractivity positioned the closest to the object, the succeeding second lens group of negative refractivity, the third lens group of positive refractivity, and the rearmost or fourth lens group of positive refractivity arranged in series, and has its first to third lens groups cooperatively combined to serve as an afocal system and its fourth lens group isolated as a master lens group for imaging (e.g., see Patent Document 5). The fourth lens group has a front lens subset 4A of positive refractivity positioned the closest to the object, a middle lens subset 4F of negative refractivity, and a rear lens subset 4B of positive refractivity arranged in series, and the rear lens subset 4F is displaced for focusing. This focusing lens subset 4F includes a composite lens having positive and negative lens pieces cemented together, which is effective in both downsizing and weight reduction of the zoom lens to such an extent of enabling quick focusing.

Similar to the large aperture telephotographing zoom lenses disclosed in Patent Documents 3 and 4, however, the one as disclosed in Patent Document 5 considerably develops curvature of field when the zoom lens at the wide-angle end renders the close object in focus, and thus, its performance of imaging is unsatisfactory. In general, as to the focusing operation by the fourth lens group serving as the master lens group, the greater a diameter of the first lens group is, the harder it is for the zoom lens to compensate for the variation in astigmatism when the zoom lens renders the close object in focus.

Yet some other prior art large aperture telephotographing zoom lenses already disclosed include that which comprises the foremost or first lens group of positive refractivity positioned the closest to the object, the succeeding second lens group of positive or negative refractivity, the third lens group of negative refractivity, and the rearmost or fourth lens group of positive refractivity arranged in series, and has its second lens group displaced for focusing (e.g., see Patent Document 6).

Such a zoom lens has its second lens group as a focusing lens displaced toward the image plane during varying the magnification for zooming from the wide-angle end to the telephoto end, so that the axial light flux incident on the entrance pupil passes closer to the optical axis when the zoom lens takes a posture at the telephoto end, and unlike the aforementioned foremost lens inner-focusing system, this system enables the zoom lens to have its focusing lens slightly downsized. In this manner, however, the resultant zoom lens is unsatisfactory in downsizing and reduction of its weight. The focusing operation by the second lens group permits astigmatism to vary to be more over-corrected when the zoom lens is in transition from a state of the infinity point in focus to another state of the close object in focus throughout the entire zoom range. When it renders the close object in focus, the zoom lens is not able to satisfactorily compensate for the variation of astigmatism that tends to be over-corrected.

SUMMARY OF THE INVENTION

The present invention is made to overcome the aforementioned disadvantages of the prior art large aperture telephotographing zoom lenses, and accordingly, it is an object of the present invention to provide a large aperture telephotographing zoom lens that employs the inner-focusing system to enable quick focusing and avoid a great aberration when the zoom lens renders the close object in focus. In addition, it is another object of the present invention to provide a large aperture telephotographing zoom lens that successfully downsizes its lens system and attains the enhanced optical performance throughout the entire zoom magnification range and the entire focusing range.

The present invention is directed to an inner-focusing telephotographing zoom lens that comprises at least five groups of lens pieces arranged in series, namely, the foremost or first lens group of positive refractivity positioned the closest to the object, the succeeding second lens group of negative refractivity, the third lens group of negative refractivity, the fourth lens group of positive refractivity, and the rearmost or fifth lens group of positive refractivity. During varying the magnification for zooming from the wide-angle end to the telephoto end, all the lens pieces of the second, third, and fourth lens groups are moved toward the image plane, and the third lens group alone is displaced for focusing.

In a first aspect of the present invention, the inner-focusing telephotographing zoom lens has its first and fifth lens groups staying still during varying the magnification for zooming.

In a second aspect of the present invention, when the magnification is varied for zooming, the inner-focusing telephotographing zoom lens has its second and third lens groups coming closer to each other in transition from the wide-angle end to the intermediate focusing range for zooming, and has the same lens groups spaced away from each other in transition from the intermediate focusing range for zooming to the telephoto end.

In a third aspect of the present invention, the inner-focusing telephotographing zoom lens has its fifth lens group divided into three subsets arranged in series, namely, a front lens subset 5A of positive refractivity positioned the closest to the object, a middle lens subset 5B of negative refractivity, and a rear lens subset 5C of positive refractivity, and the middle lens subset 5B is displaced in directions approximately perpendicular to the optical axis for compensating for vibration to stabilize the image.

In a fourth aspect of the present invention, the inner-focusing telephotographing zoom lens meets the requirements as defined in the following formulae:

$$-0.6 \leq f2/ft \leq -0.2 \quad (1)$$

$$-0.5 \leq f3/ft \leq -0.1 \quad (2)$$

where f2 is a focal length of the second lens group, f3 is a focal length of the third lens group, and ft is a focal length of the entire optical system when the zoom lens takes a posture at the telephoto end.

In a fifth aspect of the present invention, the inner-focusing telephotographing zoom lens meets the requirements as defined in the following formulae:

$$0.7 \leq f5B/f5 \leq -0.2 \quad (3)$$

where f5B is a focal length of the lens subset 5B, and f5 is a focal length of the fifth lens group.

In a sixth aspect of the present invention, at least one positive lens piece of the lens subset 5C in the inner-focusing telephotographing zoom lens meets the requirement as defined in the following formula:

$$vd \leq 30 \quad (4)$$

where vd is an Abbe number of the positive lens piece.

In a seventh aspect of the present invention, the inner-focusing telephotographing zoom lens meets the requirement as defined in the following formula:

$$2\omega \leq 50 \quad (5)$$

where $\omega$ is a half of an angle of field when the zoom lens takes a posture at the wide-angle end.

As has been described, the inner-focusing zoom lens comprises the first lens group of positive refractivity, the second lens group of negative refractivity, the third lens group of negative refractivity, the fourth lens group of positive refractivity, and the fifth lens group of positive refractivity arranged in series in this order from the distal position to the proximal position relative to the camera, and during the zooming operation by the zoom lens from the wide-angle end to the telephoto end, all the lens pieces in the second, third, and fourth lens groups are moved to the image plane.

Each of the lens groups is moved as follows: The third lens group is moved toward the image plane for varying the magnification for zooming, and the image point accordingly moved is corrected by moving the second and fourth lens groups toward the image plane. At this time, all of the three lens groups moved in such manners are desirably moved toward the image plane without any point of inflection. Designed in this way, the zoom lens has all the three moving lens groups guided by a single cam barrel instead of two or more cam barrel members, which contributes to the downsizing of the lens barrel.

The focusing operation from a state of the infinity point in focus to another state of the close object in focus is carried out by moving the third lens group toward the object. Such a focusing system in which the third lens group is displaced for focusing enables the zoom lens to reduce a diameter of the lens group that is to be displaced for focusing and also reduce its weight so as to be suitable for reducing dimensions of the focusing mechanism and quick focusing, in comparison with the foremost lens focusing system in which the foremost or first lens group is displaced for focusing and with the foremost lens inner-focusing system in which the rear one of two subsets in series in the first lens group is displaced for focusing. In addition, the displacement of the third lens group for focusing in accordance with the present invention brings about a reduced variation in spherical aberration and astigmatism relative to a variation in object distance and also attains a satisfactory imaging performance when the zoom lens renders the close object in focus.

It is preferable that the aperture stop is placed right next to the fifth lens group on the side closer to the object or placed among the lens pieces in the fifth lens group and that the aperture stop stays still during the focusing. Structured in this manner, the zoom lens has its F-number (an inverse number of the aperture ratio) fixed throughout the enter range of the varied magnification for zooming.

The first lens group preferably includes a single negative lens piece and at least two positive lens pieces arranged in series, or more desirably three positive lens pieces. Structured in this manner, the zoom lens is capable of reducing the residual spherical aberration throughout the entire zoom range.

The third lens group preferably includes at least two negative lens pieces and a single positive lens piece arranged in series. The best mode of the third lens group comprises the foremost negative meniscus lens positioned the closest to the object and having its convex surface faced toward the object, the succeeding composite lens of negative and positive lens pieces cemented together, and the rearmost negative lens piece arranged in series. Structured in this manner, the zoom lens is capable of minimizing astigmatism that tends to be under-corrected when zoom lens renders the close object in focus.

The effects of the present invention will now be described.

The inner-focusing telephotographing zoom lens in the first aspect of the present invention has its foremost and rearmost lens groups fixed in position along the optical axis during varying the magnification for zooming. Structured in this manner, the zoom lens is desirable in that it can have a simplified design of its zoom magnification mechanism and that contaminants are prevented from coming into the lens barrel. When it has a zoom ratio as high as 3× or even higher, the inner-focusing telephotographing zoom lens may have its first lens displaced during the zooming in view of the minimization of aberrations.

The inner-focusing telephotographing zoom lens in the second aspect of the invention, although its first lens group fixed in position in the optical system, has its second and third lens groups coming closer to each other along the optical axis during a transition from the wide-angle end to the intermediate focusing range for zooming, and has the same lens groups spaced farther from each other during a transition from the intermediate focusing range to the telephoto end for the further zooming. Structured in this manner, the zoom lens can satisfactorily compensate for curvature of field throughout the entire range of the varied magnification for zooming. In other words, the zoom lens is capable of compensate for the astigmatism that tends to be under-corrected at the intermediate focusing range for zooming.

The inner-focusing telephotographing zoom lens has its fifth lens group divided into three functional subsets in series, namely, a front lens subset 5A of positive refractivity positioned the closest to the object, a middle lens subset 5B of negative refractivity, and a rear lens subset 5C of positive refractivity. The middle lens subset 5B serves as a vibration compensating lens, and is displaced in directions approximately perpendicular to the optical axis for compensating for vibration to stabilize the image that may blur due to a hand shake of the user. Structured in this manner, the zoom lens can have its vibration compensation lens reduced in weight and its image stabilization mechanism reduced in dimensions.

The front lens subset 5A desirably includes at least three positive lens pieces and at least a single negative lens piece. What is desired about the front lens subset 5A is suppressing spherical aberration and comatic aberration as much as possible and converging the light flux of a large diameter to such an extent of permitting the middle lens subset 5B as the vibration compensation lens to be fabricated with a reduced outer diameter. Another version of this lens design devised to minimize the number of the lens pieces has the front lens subset 5A that comprises the foremost positive lens piece having its opposite major surfaces shaped in convexity and positioned the closest to the object, the succeeding positive meniscus lens piece having its convex surface faced toward the object, and the rearmost composite lens piece having negative and positive lens members cemented together where a positive (air space serving as) air lens is desirably interposed between the positive meniscus lens piece and the negative lens member of the cemented lens piece. Specifically, the single negative lens member along with the positive air lens can satisfactorily compensate for the spherical aberration and comatic aberration developed by three of the positive lens pieces. Structured in this manner, the zoom lens can suppress the various types of aberration and have its middle lens subset 5B reduced in outer diameter.

The most common prior art large aperture telephotographing zoom lens typically comprises four groups of lens pieces arranged in series for zooming, namely, the foremost or first lens group of positive refractivity positioned the closest to the object, the succeeding second lens group of negative refractivity, the third lens group of positive refractivity, and the fourth lens group of positive refractivity. Unlike the prior art, the zoom lens in any of the aspects of the invention, having a single additional lens group that is to be moved for zooming, thus is of a five-lens-group zoom arrangement. In any of lens designs based on the formulae (1) to (5) as mentioned below, however, the zoom lens with the additional lens group that is to be moved for zooming has its optical systems downsized and optimized in their performance to the same or even greater extent in comparison with the prior art four-lens-group zoom arrangement.

As to the inner-focusing telephotographing zoom lens in the fourth aspect of the invention, the formulae (1) and (2) define the requirements for appropriately determining focal lengths of the second and third lens groups, respectively, and such requirements are essential to reduce the dimensions of the entire optical system and to attain the desired performance:

$$-0.6 \leq f2/ft \leq -0.2 \tag{1}$$

$$-0.5 \leq f3/ft \leq -0.1 \tag{2}$$

where f2 is the focal length of the second lens group, f3 is the focal length of the third lens group, and ft is the focal length of the entire optical system when the zoom lens takes a posture at the telephoto end.

When the quotient f2/ft exceeds the upper limit defined in the formulae (1), a displacement of the second lens group becomes smaller to such an extent that the zoom lens can be advantageously reduced its enter length and the diameter of the aperture stop, but instead, the zoom lens develops a greater variation in spherical aberration and astigmatism during the zooming, which is undesirable. Besides, such a zoom lens has difficulty in compensating for the spherical aberration when the zoom lens at the telephoto end renders the close object in focus. On the other hand, when the quotient f2/ft is smaller than the lower limit defined in the formulae (1), the displacement of the second lens group significantly increases, which is also undesirable to reduce the dimensions of the optical system.

When the quotient f3/ft exceeds the upper limit defined in the formulae (2), the zoom lens can advantageously reduce the entire length and the diameter of the aperture stop and also reduce a displacement of the lens members for focusing, which facilitates designing a focusing cam arrangement. However, since the third lens group is the primary one that varies the magnification for zooming, raising the power of the third lens group brings about difficulty in compensating for various types of aberration, especially, spherical aberration, astigmatism, and comatic aberration. On the other hand, when the quotient f3/ft is smaller than the lower limit defined in the formulae (2), the zoom lens is advantageous in compensating for the various types of aberration but disadvantageous in downsizing. Especially, an increase in the displacement of the lens group for focusing results in the focusing cam having a greater entire length, which brings about difficulty in designing a layout associated with the focusing mechanism. In addition, the zoom lens has its aperture stop increased in diameter, and accordingly has its lens barrel increased in diameter, which is also undesirable.

Also, as to the aforementioned inner-focusing telephotographing zoom lens in the fifth aspect of present invention, the formulae (3) define the requirements for appropriately determining focal lengths of the middle lens subset 5B and the fifth lens group, respectively:

$$-0.7 \leq f5B/f5 \leq -0.2 \quad (3)$$

where f5B is the focal length of the middle lens subset 5B, and f5 is the focal length of the fifth lens group.

When the quotient f5B/f5 exceeds the upper limit defined in the formulae (3), the lens group dedicated to image stabilization against external vibration has its power raised, and this is advantageous in reducing the dimensions of that lens group but instead leads to difficulty in compensating for various types of aberration, especially, spherical aberration and astigmatism. On the other hand, when the quotient f5B/f5 is smaller than the lower limit defined in the formulae (3), the zoom lens can advantageously compensate for the various types of aberration but instead has its lens group dedicated to image stabilization increased in outer diameter and also increased in displacement in a direction perpendicular to the optical axis during stabilizing the image against external vibration, and this results in an image stabilizing actuator having greater dimensions, which is undesirable.

As to the inner-focusing telephotographing zoom lens in the sixth aspect of the invention, the formula (4) defines the requirement for satisfactorily compensating for chromatic aberration of magnification and comatic aberration:

$$vd \leq 30 \quad (4)$$

where vd is an Abbe number of the at least single positive lens piece in the rear lens subset 5C.

When the product vd exceeds the supremum defined in the formula (4), the zoom lens at the wide-angle end has difficulty in satisfactorily compensating for chromatic aberration of magnification of the g-line and comatic aberration of the g-line incident on the entrance pupil in its upper peripheral portion while the zoom lens at the telephoto end has also difficulty in satisfactorily compensating for comatic aberration of the C-line incident on the entrance pupil in its upper peripheral portion.

As to the inner-focusing telephotographing zoom lens in the seventh aspect of the invention, the formula (5) defines an angle of field of the zoom lens at the wide-angle end:

$$2\omega \leq 50 \quad (5)$$

where ω is a half of an angle of field when the zoom lens takes a posture at the wide-angle end.

When the product 2ω is smaller than the supremum defined in the formula (5), the zoom lens has difficulty in compensating for astigmatism that tends to be under-corrected when the zoom lens at the wide-angle end renders the close object in focus, which is undesirable.

BRIEF DESCRIPTION OF THE ACCOMPANYING DRAWINGS

Figure 13:
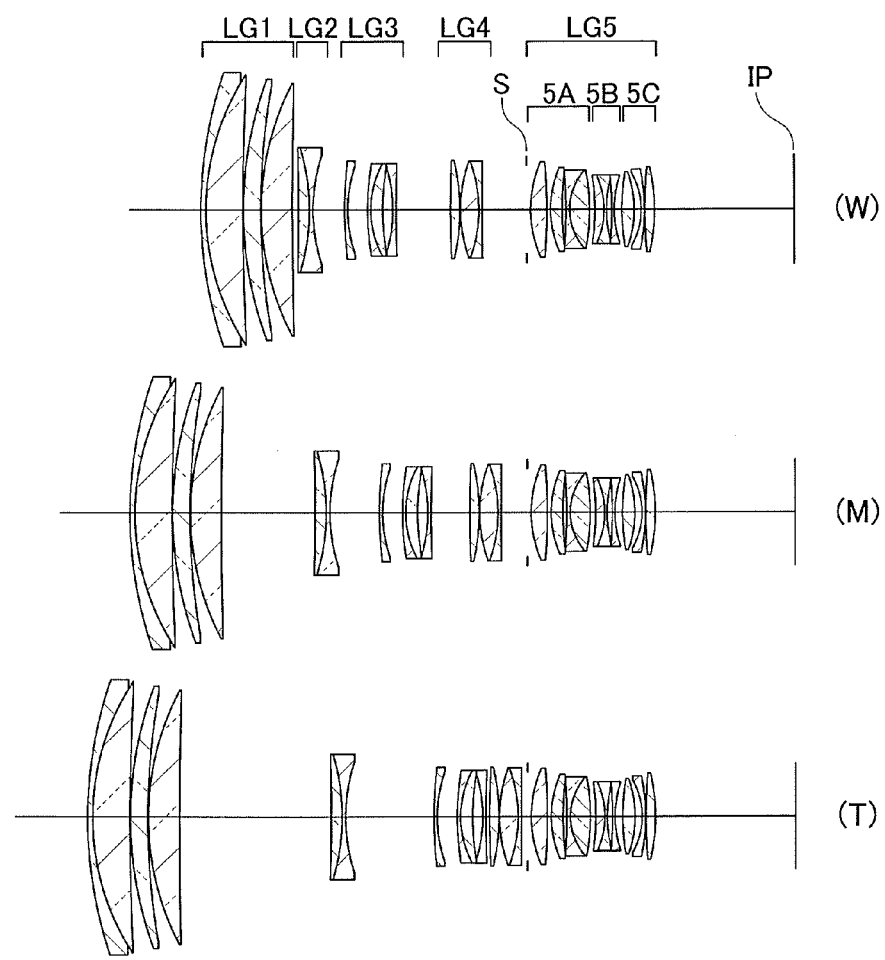

FIG. 1 is a vertical sectional view of a first embodiment of an inner-focusing telephotographing zoom lens according to the present invention, showing the zoom lens renders the infinity point in focus where the zoom lens takes a varied posture for focusing at the wide-angle end (W), at the intermediate focusing range (M), and at the telephoto end (T);

FIG. 2(a) provides graphs depicting various types of aberration when the first embodiment of the inner-focusing telephotographing zoom lens at the wide-angle end renders the infinity point in focus;

FIG. 2(b) provides graphs depicting the various types of aberration when the first embodiment of the inner-focusing telephotographing zoom lens at the wide-angle end renders the close object in focus;

FIG. 3(a) provides graphs depicting the various types of aberration when the first embodiment of the inner-focusing telephotographing zoom lens at the intermediate focusing range renders the infinity point in focus;

FIG. 3(b) provides graphs depicting the various types of aberration when the first embodiment of the inner-focusing telephotographing zoom lens at the intermediate focusing range renders the close object in focus;

FIG. 4(a) provides graphs depicting various types of aberration when the first embodiment of the inner-focusing telephotographing zoom lens at the telephoto end renders the infinity point in focus;

FIG. 4(b) provides graphs depicting the various types of aberration when the first embodiment of the inner-focusing telephotographing zoom lens at the telephoto end renders the close object in focus;

FIG. 5 is a vertical sectional view of a second embodiment of the inner-focusing telephotographing zoom lens according to the present invention, showing the zoom lens renders the infinity point in focus where the zoom lens takes a varied posture for focusing at the wide-angle end (W), at the intermediate focusing range (M), and at the telephoto end (T);

FIG. 6(a) provides graphs depicting various types of aberration when the second embodiment of the inner-focusing telephotographing zoom lens at the wide-angle end renders the infinity point in focus;

FIG. 6(b) provides graphs depicting the various types of aberration when the second embodiment of the inner-focusing telephotographing zoom lens at the wide-angle end renders the close object in focus;

FIG. 7(a) provides graphs depicting the various types of aberration when the second embodiment of the inner-focusing telephotographing zoom lens at the intermediate focusing range renders the infinity point in focus;

FIG. 7(b) provides graphs depicting the various types of aberration when the second embodiment of the inner-focusing telephotographing zoom lens at the intermediate focusing range renders the close object in focus;

FIG. 8(a) provides graphs depicting the various types of aberration when the second embodiment of the inner-focusing telephotographing zoom lens at the telephoto end renders the infinity point in focus;

FIG. 8(b) provides graphs depicting the various types of aberration when the second embodiment of the inner-focusing telephotographing zoom lens at the telephoto end renders the close object in focus;

FIG. 9 is a vertical sectional view of a third embodiment of the inner-focusing telephotographing zoom lens according to the present invention, showing the zoom lens renders the infinity point in focus where the zoom lens takes a varied posture for focusing at the wide-angle end (W), at the intermediate focusing range (M), and at the telephoto end (T);

FIG. 10(a) provides graphs depicting various types of aberration when the third embodiment of the inner-focusing telephotographing zoom lens at the wide-angle end renders the infinity point in focus;

FIG. 10(b) provides graphs depicting the various types of aberration when the third embodiment of the inner-focusing telephotographing zoom lens at the wide-angle end renders the close object in focus;

FIG. 11(a) provides graphs depicting the various types of aberration when the third embodiment of the inner-focusing telephotographing zoom lens at the intermediate focusing range renders the infinity point in focus;

FIG. 11(b) provides graphs depicting the various types of aberration when the third embodiment of the inner-focusing telephotographing zoom lens at the intermediate focusing range renders the close object in focus;

FIG. 12(a) provides graphs depicting the various types of aberration when the third embodiment of the inner-focusing telephotographing zoom lens at the telephoto end renders the infinity point in focus;

FIG. 12(b) provides graphs depicting the various types of aberration when the third embodiment of the inner-focusing telephotographing zoom lens at the telephoto end renders the close object in focus;

FIG. 13 is a vertical sectional view of a fourth embodiment of the inner-focusing telephotographing zoom lens according to the present invention, showing the zoom lens renders the infinity point in focus where the zoom lens takes a varied posture for focusing at the wide-angle end (W), at the intermediate focusing range (M), and at the telephoto end (T);

FIG. 14(a) provides graphs depicting various types of aberration when the fourth embodiment of the inner-focusing telephotographing zoom lens at the wide-angle end renders the infinity point in focus;

FIG. 14(b) provides graphs depicting the various types of aberration when the fourth embodiment of the inner-focusing telephotographing zoom lens at the wide-angle end renders the close object in focus;

FIG. 15(a) provides graphs depicting the various types of aberration when the fourth embodiment of the inner-focusing telephotographing zoom lens at the intermediate focusing range renders the infinity point in focus;

FIG. 15(b) provides graphs depicting the various types of aberration when the fourth embodiment of the inner-focusing telephotographing zoom lens at the intermediate focusing range renders the close object in focus;

FIG. 16(a) provides graphs depicting the various types of aberration when the fourth embodiment of the inner-focusing telephotographing zoom lens at the telephoto end renders the infinity point in focus; and FIG. 16(b) provides graphs depicting the various types of aberration when the fourth embodiment of the inner-focusing telephotographing zoom lens at the telephoto end renders the close object in focus.

BEST MODE OF THE INVENTION

In tables containing numerical data below in association with the embodiments of the present invention, all the lengths are in millimeters (mm) while all the angles are in degrees (°). As to abbreviated descriptions for the numerical data, f is a focal length, bf is a back focus, FNo. is an F-number, ω is a half of an angle of field, r is a curvature of radius, d is a distance between surfaces of a lens piece(es), nd is a refractive index for the d-line, and vd is an Abbe number.

Any of embodiments of an inner-focusing telephotographing zoom lens according to the present invention, as shown in vertical sectional views of FIGS. 1, 5, 9 and 13, comprises the foremost or first lens group LG1 of positive refractivity positioned the closest to the object, the succeeding second lens group LG2 of negative refractivity, the third lens group LG3 of negative refractivity, the fourth lens group LG4 of positive refractivity, and the rearmost or fifth lens group LG5 of positive refractivity arranged in series. The fifth lens group LG5 has a front lens subset 5A of positive refractivity positioned the closest to the object, a middle lens subset 5B of negative refractivity, and a rear lens subset 5C of positive refractivity arranged in series. The lens subset 5B serves as a vibration compensation lens and is to be displaced approximately perpendicular to the optical axis for image stabilization. S designates an aperture stop, and IP denotes an image plane.

Embodiment 1

| f = 71.8000~194.5000 | | | |
| FNo. = 2.90 | | | |
| 2ω = 33.71~12.42 | | | |
| Object Surface ∞ (d0) | | | |

| Lens Surface # | r | d | nd | vd |
| --- | --- | --- | --- | --- |
| 1 | 133.7102 | 2.0000 | 1.80610 | 33.27 |
| 2 | 77.3487 | 8.5500 | 1.43700 | 95.10 |
| 3 | 537.2688 | 0.2000 | | |
| 4 | 116.5358 | 4.6988 | 1.49700 | 81.61 |
| 5 | 298.9745 | 0.2000 | | |
| 6 | 84.2299 | 8.2046 | 1.49700 | 81.61 |
| 7 | 3112.4218 | (d7) | | |
| 8 | −2017.5362 | 3.5529 | 1.90366 | 31.31 |
| 9 | −106.5734 | 1.5000 | 1.69680 | 55.46 |
| 10 | 51.7905 | (d10) | | |
| 11 | 226.3153 | 1.3000 | 1.61800 | 63.39 |
| 12 | 60.1827 | 3.2285 | | |
| 13 | 407.1084 | 1.3000 | 1.48749 | 70.44 |
| 14 | 40.0019 | 4.8000 | 1.80518 | 25.46 |
| 15 | 205.8653 | 3.1602 | | |
| 16 | −66.4978 | 1.3000 | 1.83481 | 42.72 |
| 17 | 230.8342 | (d17) | | |
| 18 | 378.2306 | 3.8000 | 1.77250 | 49.62 |
| 19 | −93.1471 | 0.2000 | | |
| 20 | 49.2255 | 9.6077 | 1.48749 | 70.44 |
| 21 | −52.6701 | 1.3000 | 1.83481 | 42.72 |

-continued f = 71.8000~194.5000
FNo. = 2.90
2ω = 33.71~12.42
Object Surface ∞ (d0)

| | | | | |
|---|---|---|---|---|
| 22 | 497.7462 | (d22) | | |
| 23 | (Stop)∞ | 3.8462 | | |
| 24 | 48.2164 | 7.9959 | 1.72916 | 54.67 |
| 25 | −113.7175 | 0.2000 | | |
| 26 | 45.1106 | 4.5932 | 1.49700 | 81.61 |
| 27 | 163.1315 | 1.8091 | | |
| 28 | −99.0801 | 1.5000 | 1.80610 | 33.27 |
| 29 | 26.4891 | 8.3490 | 1.49700 | 81.61 |
| 30 | −86.0385 | 1.7067 | | |
| 31 | −133.2957 | 3.7000 | 1.80518 | 25.46 |
| 32 | −33.1117 | 1.0000 | 1.56883 | 56.04 |
| 33 | 99.7696 | 1.8312 | | |
| 34 | −78.7563 | 1.0000 | 1.60342 | 38.01 |
| 35 | 40.8845 | 3.0000 | | |
| 36 | 118.2041 | 7.5038 | 1.6980 | 55.46 |
| 37 | −39.085 | 2.5092 | | |
| 38 | −29.1014 | 1.3000 | 1.90366 | 31.31 |
| 39 | −101.842 | 0.2000 | | |
| 40 | 160.349 | 3.9189 | 1.84666 | 23.78 |
| 41 | −80.3525 | (bf) | | |

| | Wide-Angle | Intermediate | Telephoto |
|---|---|---|---|
| Varied distances when the zoom lens renders the infinity point in focus are provided below: | | | |
| f | 71.8000 | 118.0000 | 194.5000 |
| d0 | ∞ | ∞ | ∞ |
| d7 | 2.2014 | 25.5869 | 39.7471 |
| d10 | 20.5031 | 13.5000 | 18.9574 |
| d17 | 21.2237 | 13.7979 | 1.5461 |
| d22 | 17.8225 | 8.8658 | 1.5000 |
| bf | 57.0050 | 57.0050 | 57.0050 |
| Varied distances when the zoom lens renders the close object in focus (object distance 1.3 m) are provided below: | | | |
| f | 67.8957 | 101.5451 | 135.4638 |
| d0 | 1065.7000 | 1065.7000 | 1065.7000 |
| d7 | 2.2014 | 25.5869 | 39.7471 |
| d10 | 18.2357 | 8.2041 | 6.9574 |
| d17 | 23.4911 | 19.0938 | 13.5461 |
| d22 | 17.8225 | 8.8658 | 1.5000 |
| bf | 57.0050 | 57.0050 | 57.0050 |

Values are given to the terms in the formulae (1) to (5) as follows:

| | |
|---|---|
| Formulae (1) | −0.43 |
| Formulae (2) | −0.27 |
| Formulae (3) | −0.41 |
| Formula (4) | 23.78 |
| Formula (5) | 33.71 |

Embodiment 2 f = 71.8000~194.5000
FNo. = 2.90
2ω = 33.99~12.38
Object Surface ∞ (d0)

| Lens Surface # | r | d | nd | vd |
|---|---|---|---|---|
| 1 | 168.0695 | 2.0000 | 1.80610 | 33.27 |
| 2 | 86.3890 | 7.1516 | 1.43700 | 95.10 |
| 3 | 335.2996 | 0.2000 | | |
| 4 | 108.3062 | 8.6332 | 1.49700 | 81.61 |
| 5 | −440.8938 | 0.2000 | | |
| 6 | 87.3580 | 5.8682 | 1.49700 | 81.61 |
| 7 | 258.7690 | (d7) | | |
| 8 | −436.3849 | 4.8930 | 1.90366 | 31.31 |

-continued f = 71.8000~194.5000
FNo. = 2.90
2ω = 33.99~12.38
Object Surface ∞ (d0)

| | | | | |
|---|---|---|---|---|
| 9 | −83.9220 | 1.5000 | 1.69680 | 55.46 |
| 10 | 56.0461 | (d10) | | |
| 11 | 373.3183 | 1.5000 | 1.61800 | 63.39 |
| 12 | 36.5197 | 4.5000 | 1.80518 | 25.46 |
| 13 | 80.4129 | 3.8423 | | |
| 14 | −66.4998 | 1.5000 | 1.72916 | 54.67 |
| 15 | 255.9223 | (d15) | | |
| 16 | 181.0687 | 4.5000 | 1.65844 | 50.85 |
| 17 | −144.4009 | 0.2000 | | |
| 18 | 62.3870 | 7.7276 | 1.48749 | 70.44 |
| 19 | −46.0414 | 1.3000 | 1.83481 | 42.72 |
| 20 | −352.3157 | (d20) | | |
| 21 | ∞ | 11.6606 | | |
| 22 | 47.6896 | 6.6162 | 1.7291 | 54.67 |
| 23 | −209.7151 | 0.2000 | | |
| 24 | 33.3934 | 3.4765 | 1.48749 | 70.44 |
| 25 | 54.2887 | 1.9564 | | |
| 26 | 310.5595 | 1.5000 | 1.80610 | 33.27 |
| 27 | 23.1240 | 7.2903 | 1.49700 | 81.61 |
| 28 | −371.5104 | 1.7000 | | |
| 29 | 71.6469 | 3.8000 | 1.76182 | 26.61 |
| 30 | −79.4991 | 1.0000 | 1.54072 | 47.20 |
| 31 | 37.4048 | 3.3284 | | |
| 32 | −81.8037 | 1.0000 | 1.60342 | 38.01 |
| 33 | 35.4101 | 3.0000 | | |
| 34 | 68.1495 | 3.1002 | 1.72916 | 54.67 |
| 35 | −828.2488 | 0.2000 | | |
| 36 | 210.7522 | 3.4497 | 1.49700 | 81.61 |
| 37 | −71.1434 | 2.2774 | | |
| 38 | −29.4822 | 1.3000 | 1.91082 | 35.25 |
| 39 | −102.8778 | 0.2000 | | |
| 40 | 232.6053 | 4.0351 | 1.84666 | 23.78 |
| 41 | −69.2522 | (bf) | | |

| | Wide-Angle | Intermediate | Telephoto |
|---|---|---|---|
| Varied distances when the zoom lens renders the infinity point in focus are provided below: | | | |
| f | 71.8000 | 135.0000 | 194.5000 |
| d0 | ∞ | ∞ | ∞ |
| d7 | 4.2635 | 31.2149 | 40.2635 |
| d10 | 18.2735 | 14.4022 | 20.2735 |
| d15 | 25.3011 | 12.8457 | 1.5000 |
| d20 | 15.6989 | 5.0743 | 1.5000 |
| bf | 52.2642 | 52.2642 | 52.2642 |
| Varied distances when the zoom lens renders the close object in focus (object distance 1.26 m) are provided below: | | | |
| f | 67.2740 | 108.2043 | 129.9725 |
| d0 | 1027.6700 | 1027.6700 | 1027.6700 |
| d7 | 4.2635 | 31.2149 | 40.2635 |
| d10 | 15.2632 | 5.7166 | 4.7735 |
| d15 | 28.3115 | 21.5312 | 17.0000 |
| d20 | 15.6989 | 5.0743 | 1.5000 |
| bf | 52.2642 | 52.2642 | 52.2642 |

Values are given to the terms in the formulae (1) to (5) as follows:

| | |
|---|---|
| Formulae (1) | −0.43 |
| Formulae (2) | −0.31 |
| Formulae (3) | −0.47 |
| Formula (4) | 23.78 |
| Formula (5) | 33.99 |

Embodiment 3 f = 71.8000~194.5000
FNo. = 2.90
2ω = 34.24~12.38
Object Surface ∞ (d0)

| Lens Surface # | r | d | nd | vd |
|---|---|---|---|---|
| 1 | 202.0514 | 2.0000 | 1.80610 | 33.27 |
| 2 | 96.9930 | 7.7606 | 1.43700 | 95.10 |
| 3 | 2214.1253 | 0.2000 | | |
| 4 | 144.7217 | 4.9708 | 1.49700 | 81.61 |
| 5 | 878.7669 | 0.2000 | | |
| 6 | 104.2134 | 7.5000 | 1.49700 | 81.61 |
| 7 | −2277.6749 | (d7) | | |
| 8 | −251.5154 | 3.4898 | 1.90366 | 31.31 |
| 9 | −91.9596 | 1.5000 | 1.61800 | 63.39 |
| 10 | 67.7784 | (d10) | | |
| 11 | 310.8067 | 1.3000 | 1.61800 | 63.39 |
| 12 | 39.4576 | 3.5312 | 1.84666 | 23.78 |
| 13 | 74.6176 | 3.7826 | | |
| 14 | −85.1546 | 1.3000 | 1.77250 | 49.62 |
| 15 | 266.9081 | (d15) | | |
| 16 | 107.7423 | 3.3267 | 1.90366 | 31.31 |
| 17 | −531.1804 | 0.2000 | | |
| 18 | 75.4766 | 6.7244 | 1.49700 | 81.61 |
| 19 | −54.8088 | 1.3000 | 1.90366 | 31.31 |
| 20 | −3998.1043 | (d20) | | |
| 21 | ∞ | 8.7534 | | |
| 22 | 54.1984 | 7.0000 | 1.72916 | 54.67 |
| 23 | −227.1268 | 0.2000 | | |
| 24 | 29.8676 | 5.0108 | 1.49700 | 81.61 |
| 25 | 54.6562 | 0.8501 | | |
| 26 | 87.5523 | 1.5000 | 1.80610 | 33.27 |
| 27 | 20.4726 | 8.8057 | 1.51680 | 64.20 |
| 28 | 75.7855 | 3.0000 | | |
| 29 | −184.7505 | 2.4265 | 1.80809 | 22.76 |
| 30 | −60.1780 | 1.0000 | 1.48749 | 70.44 |
| 31 | 31.6747 | 2.6287 | | |
| 32 | 2537.9359 | 1.0000 | 1.62004 | 36.30 |
| 33 | 71.3329 | 2.5000 | | |
| 34 | 115.819 | 3.0110 | 1.69680 | 55.46 |
| 35 | −146.3896 | 0.2000 | | |
| 36 | 69.9312 | 4.4440 | 1.49700 | 81.61 |
| 37 | −75.6379 | 2.2360 | | |
| 38 | −35.8703 | 1.5000 | 1.91082 | 35.25 |
| 39 | −380.1377 | 0.2000 | | |
| 40 | 94.3088 | 3.5300 | 1.84666 | 23.78 |
| 41 | −200.8297 | (bf) | | |

| | Wide-Angle | Intermediate | Telephoto |
|---|---|---|---|

Varied distances when the zoom lens renders the infinity point in focus are provided below:

| | | | |
|---|---|---|---|
| f | 71.8000 | 118.3000 | 194.5000 |
| d0 | ∞ | ∞ | ∞ |
| d7 | 2.5324 | 28.9303 | 44.5324 |
| d10 | 25.7682 | 17.3185 | 23.7682 |
| d15 | 29.4896 | 18.7279 | 1.5000 |
| d20 | 15.5561 | 8.3694 | 3.5454 |
| bf | 52.1793 | 52.1793 | 52.1793 |

Varied distances when the zoom lens renders the close object in focus (object distance 1.22 m) are provided below:

| | | | |
|---|---|---|---|
| f | 66.6965 | 97.4987 | 125.2552 |
| d0 | 987.1200 | 987.1200 | 987.1200 |
| d7 | 2.5324 | 28.9303 | 44.5324 |
| d10 | 21.9736 | 8.4568 | 4.1998 |
| d15 | 33.2839 | 27.5895 | 21.0684 |
| d20 | 15.5561 | 8.3694 | 3.5454 |
| bf | 52.1793 | 52.1793 | 52.1793 |

Values are given to the terms in the formulae (1) to (5) as follows:

| | |
|---|---|
| Formulae (1) | −0.53 |
| Formulae (2) | −0.34 |
| Formulae (3) | −0.49 |
| Formulae (4) | 23.78 |
| Formulae (5) | 34.24 |

Embodiment 4 f = 71.8000~229.9997
FNo. = 2.90
2ω = 33.91~10.52
Object Surface ∞ (d0)

| Lens Surface # | r | d | nd | vd |
|---|---|---|---|---|
| 1 | 168.9039 | 2.0000 | 1.80610 | 33.27 |
| 2 | 98.9727 | 15.0000 | 1.43700 | 95.10 |
| 3 | 992.0413 | 0.2000 | | |
| 4 | 150.4149 | 7.000 | 1.49700 | 81.61 |
| 5 | 288.2782 | 0.2000 | | |
| 6 | 109.2986 | 12.5000 | 1.49700 | 81.61 |
| 7 | 1870.7002 | (d7) | | |
| 8 | −776.2971 | 4.3383 | 1.90366 | 31.31 |
| 9 | −86.4752 | 1.5000 | 1.69680 | 55.46 |
| 10 | 70.7400 | (d10) | | |
| 11 | 170.2668 | 1.3000 | 1.61800 | 63.39 |
| 12 | 55.4466 | 8.0000 | | |
| 13 | 113.9570 | 1.3000 | 1.48749 | 70.44 |
| 14 | 38.9641 | 4.8000 | 1.80518 | 25.46 |
| 15 | 99.8184 | 4.0570 | | |
| 16 | −59.8081 | 1.3000 | 1.83481 | 42.72 |
| 17 | 417.6836 | (d17) | | |
| 18 | 452.6093 | 3.8000 | 1.77250 | 49.62 |
| 19 | −84.5970 | 0.2000 | | |
| 20 | 57.1824 | 7.4108 | 1.48749 | 70.44 |
| 21 | −55.3730 | 1.3000 | 1.83481 | 42.72 |
| 22 | 2673.0074 | (d22) | | |
| 23 | (Stop)∞ | 1.5000 | | |
| 24 | 47.4953 | 6.5818 | 1.72916 | 54.67 |
| 25 | −218.9876 | 1.5454 | | |
| 26 | 42.0736 | 4.6774 | 1.49700 | 81.61 |
| 27 | 131.0314 | 1.5022 | | |
| 28 | −215.3921 | 1.5000 | 1.80610 | 33.27 |
| 29 | 23.6600 | 8.0000 | 1.49700 | 81.61 |
| 30 | −83.5476 | 2.1511 | | |
| 31 | −93.1477 | 3.7000 | 1.80518 | 25.46 |
| 32 | −32.7574 | 1.0000 | 1.56883 | 56.04 |
| 33 | 51.9678 | 2.1285 | | |
| 34 | −139.1688 | 1.0000 | 1.60342 | 38.01 |
| 35 | 43.4693 | 3.0000 | | |
| 36 | 85.1764 | 4.9500 | 1.69680 | 55.46 |
| 37 | −45.5489 | 2.8325 | | |
| 38 | −29.7059 | 1.3000 | 1.90366 | 31.31 |
| 39 | −81.5868 | 0.2000 | | |
| 40 | 200.1011 | 3.8555 | 1.84666 | 23.78 |
| 41 | −74.7257 | bf | | |

| | Wide-Angle | Intermediate | Telephoto |
|---|---|---|---|

Varied distances when the zoom lens renders the infinity point in focus are provided below:

| | | | |
|---|---|---|---|
| f | 71.8000 | 118.0000 | 229.9997 |
| d0 | ∞ | ∞ | ∞ |
| d7 | 2.5167 | 37.7120 | 60.9113 |
| d10 | 12.7284 | 20.0434 | 35.5626 |
| d17 | 21.9412 | 15.5134 | 1.5000 |
| d22 | 18.1051 | 10.5147 | 2.5010 |
| bf | 56.3966 | 56.3966 | 56.3966 |

-continued f = 71.8000~229.9997
FNo. = 2.90
2ω = 33.91~10.52
Object Surface ∞ (d0)

Varied distances when the zoom lens renders the close
object in focus (object distance 1.3 m) are provided below:

| f | 68.0065 | 4102.2086 | 149.9352 |
|---|---|---|---|
| d0 | 1160.0000 | 1131.5100 | 1114.8200 |
| d7 | 2.5167 | 37.7120 | 60.9113 |
| d10 | 10.5781 | 14.9221 | 20.9629 |
| d17 | 24.0915 | 20.6346 | 16.0997 |
| d22 | 18.1051 | 10.5147 | 2.5010 |
| bf | 56.3966 | 56.3966 | 56.3966 |

Values are given to the terms in the formulae (1) to (5) as follows:

| Formulae (1) | −0.50 |
|---|---|
| Formulae (2) | −0.22 |
| Formulae (3) | −0.33 |
| Formula (4) | 23.78 |
| Formula (5) | 33.91 |

DESCRIPTION OF THE ALPHANUMERIC SYMBOLS

S Aperture Stop
IP Image Plane
LG1 1st Lens Group
LG2 2nd Lens Group
LG3 3rd Lens Group
LG4 4th Lens Group
LG5 5th Lens Group
5A Front Lens Subset of the 5th Lens Group
5B Middle Lens Subset of the 5th Lens Group
5C Rear Lens Subset of the 5th Lens Group

What is claimed is:

1. An inner-focusing telephotographing zoom lens having a wide-angle end, a telephoto end, and an image plane and, comprising at least five groups of lens pieces arranged in series, including a foremost or first lens group of positive refractivity positioned the closest to an object, a succeeding second lens group of negative refractivity, a third lens group of negative refractivity, a fourth lens group of positive refractivity, and a rearmost or fifth lens group of positive refractivity; during varying the magnification for zooming in a transition from the wide-angle end to the telephoto end, all the lens pieces of the second, third, and fourth lens groups being moved toward the image plane, and the third lens group alone being displaced for focusing.

2. The inner-focusing telephotographing zoom lens according to claim 1, wherein the zoom lens has its first and fifth lens groups staying still during varying the magnification for zooming.

3. The inner-focusing telephotographing zoom lens according to claim 2, wherein when the magnification is varied for zooming, the zoom lens has its second and third lens groups coming closer to each other in transition from the wide-angle end to an intermediate focusing range for zooming, and has the same lens groups spaced away from each other in transition from the intermediate focusing range for zooming to the telephoto end.

4. The inner-focusing telephotographing zoom lens according to claim 1, wherein the zoom lens has its fifth lens group divided into three subsets arranged in series, comprising a front lens subset 5A of positive refractivity positioned the closest to the object, a middle lens subset 5B of negative refractivity, and a rear lens subset 5C of positive refractivity, and the middle lens subset 5B is displaced in directions approximately perpendicular to the optical axis for compensating for vibration to stabilize the image.

5. The inner-focusing telephotographing zoom lens according to claim 1, wherein the zoom lens meets the requirements as defined in the following formulae:

$$-0.6 \leq f2/ft \leq -0.2 \quad (1)$$

$$-0.5 \leq f3/ft \leq -0.1 \quad (2)$$

where f2 is a focal length of the second lens group, f3 is a focal length of the third lens group, and ft is a focal length of the entire optical system when the zoom lens takes a posture at the telephoto end.

6. The inner-focusing telephotographing zoom lens according to claim 4, wherein the zoom lens meets the requirements as defined in the following formula:

$$-0.7 \leq f5B/f5 \leq -0.2 \quad (3)$$

where f5B is a focal length of the lens subset 5B, and f5 is a focal length of the fifth lens group.

7. The inner-focusing telephotographing zoom lens according to claim 4 wherein at least one positive lens piece of the lens subset 5C in the zoom lens meets the requirement as defined in the following formula:

$$vd \leq 30 \quad (4)$$

where vd is an Abbe number of the positive lens piece.

8. The inner-focusing telephotographing zoom lens according to claim 6 wherein at least one positive lens piece of the lens subset 5C in the zoom lens meets the requirement as defined in the following formula:

$$vd \leq 30 \quad (4)$$

where vd is an Abbe number of the positive lens piece.

9. The inner-focusing telephotographing zoom lens according to claim 1, wherein the zoom lens meets the requirement as defined in the following formula:

$$2\omega \leq 50 \quad (5)$$

where ω is a half of an angle of field when the zoom lens takes a posture at the wide-angle end.

* * * * *